(12) United States Patent
Abe et al.

(10) Patent No.: US 8,384,919 B2
(45) Date of Patent: Feb. 26, 2013

(54) INFORMATION PROCESSING APPARATUS AND PERIPHERAL APPARATUS CONTROL METHOD

(75) Inventors: Koichi Abe, Yokohama (JP); Kenichiro Uotani, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1099 days.

(21) Appl. No.: 11/774,079

(22) Filed: Jul. 6, 2007

(65) Prior Publication Data
US 2008/0007742 A1    Jan. 10, 2008

(30) Foreign Application Priority Data
Jul. 7, 2006   (JP) .................................. 2006-188328

(51) Int. Cl.
G06F 3/12     (2006.01)
G06F 3/00     (2006.01)
G06F 3/048    (2006.01)
(52) U.S. Cl. .......................... 358/1.13; 710/8; 715/853
(58) Field of Classification Search .................. None
See application file for complete search history.

(56) References Cited

U.S. PATENT DOCUMENTS

| | | | |
|---|---|---|---|
| 2003/0037128 A1* | 2/2003 | Beadles et al. ................ 709/220 |
| 2003/0079063 A1* | 4/2003 | Iida et al. ........................... 710/8 |
| 2005/0027728 A1* | 2/2005 | O'Neil et al. ................. 707/100 |
| 2005/0027743 A1* | 2/2005 | O'Neil et al. ............... 707/104.1 |
| 2006/0023244 A1* | 2/2006 | Mitsui .......................... 358/1.13 |
| 2006/0085440 A1* | 4/2006 | Jandhyala et al. ............. 707/100 |
| 2006/0106775 A1* | 5/2006 | Kuhn et al. ....................... 707/3 |
| 2006/0221361 A1* | 10/2006 | Takagi ............................ 358/1.1 |
| 2007/0273895 A1* | 11/2007 | Cudd et al. ..................... 358/1.1 |

FOREIGN PATENT DOCUMENTS
JP    10-275064    10/1998

* cited by examiner

*Primary Examiner* — Vincent Rudolph
(74) *Attorney, Agent, or Firm* — Fitzpatrick, Cella, Harper & Scinto

(57) ABSTRACT

An information processing apparatus has a peripheral apparatus control unit which controls a peripheral apparatus and an operation control unit which controls the operation in the peripheral apparatus by using operation instructing information regarding such an operation. The peripheral apparatus control unit forms first operation instructing information having a non-hierarchical structure from operation setting information including a specific setting, sets the specific setting into a private area in the first operation instructing information, and forms second operation instructing information having a hierarchical structure and including the specific setting from the first operation instructing information.

9 Claims, 50 Drawing Sheets

FIG. 7

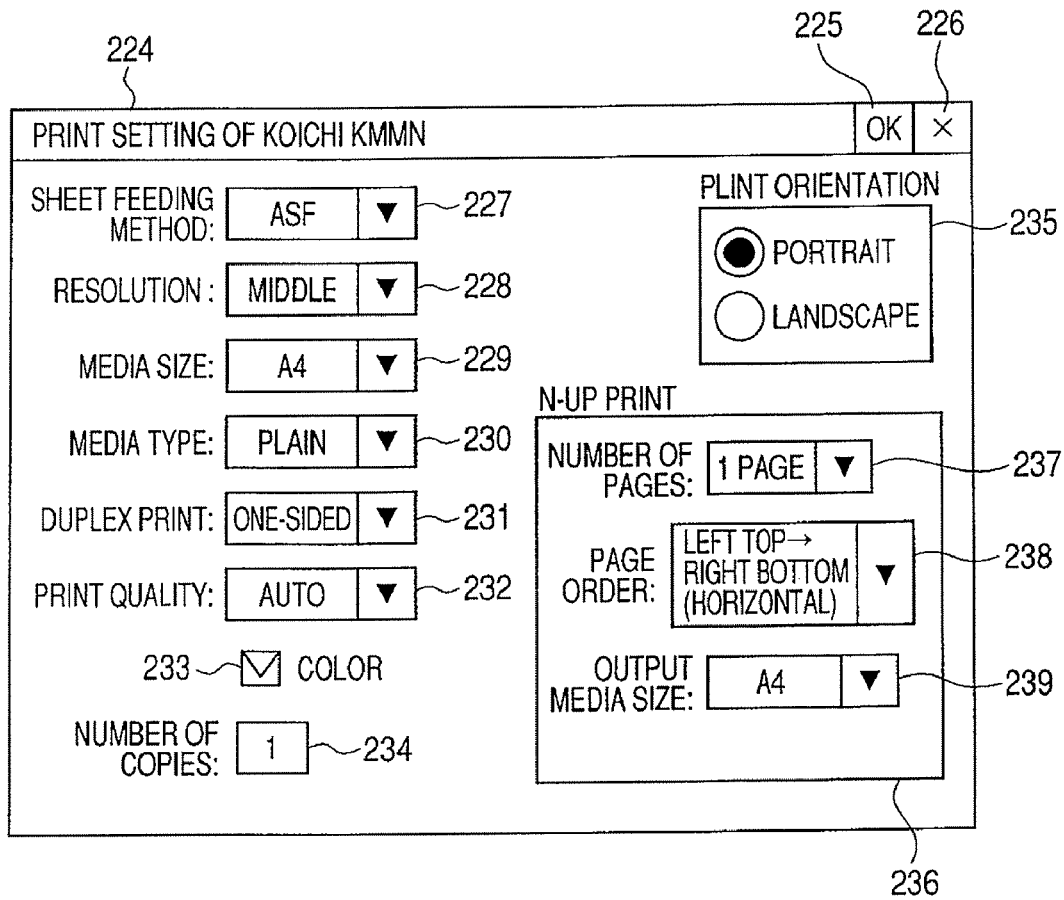

FIG. 8

```
typedef struct _PRINT_MODE{
        long    *inputBin;                  // InputBin
        long    *orientation;               // Orientation
        long    *color;                     // Color
        long    *resolution;                // Resolution
        long    *mediaType;                 // MediaType
        long    *duplex;                    // Duplex
        long    *nUp;                       // NUp
        long    *presentationDirection;     // PresentationDirection
        long    *mediaSize;                 // MediaSize
        long    *outputQuality;             // OutputQuality
        long    *outputMediaSize;           // OutputMediaSize
        long    copyCount;                  // CopyCount
}PRINT_MODE, *PPRINT_MODE;
```

FIG. 9

ModelName: "Koichi KMMN"

Feature: InputBin
{
  Default: ASF

Option: ASF
  {
    ID: 7
  }

Option: Cassette
  {
    ID: 267
  }
}

FIG. 10

Feature: Orientation
{
  Default: Portrait

Option: Portrait
  {
    ID: 21
  }

Option: Landscape
  {
    ID: 22
  }
}

FIG. 11

```
Feature: OutputColor
{
  Default: Color

Option: Color
  {
    ID: 31
  }

Option: Monochrome
  {
    ID: 33
  }
}
```

FIG. 12

```
Feature: Resolution
{
  Default: Standard

Option: High
  {
    ID: -4
    DPI: (600, 600)
  }

Option: Standard
  {
    ID: -3
    DPI: (300, 300)
  }
}
```

FIG. 13

```
Feature: MediaType
{
  Default: Plain

Option: Plain
  {
    ID: 1
  }

Option: Photo
  {
    ID: 2
  }

Option: ProPhoto
  {
    ID: 285
  }
}
```

FIG. 14

```
Feature: Duplex
{
  Default: OneSided

Option: OneSided
  {
    ID: 51
  }

Option: TwoSidedLongEdge
  {
    ID: 52
  }

Option: TwoSidedShortEdge
  {
    ID: 53
  }
}
```

FIG. 15

```
Feature: NUp
{
  Default: PagesPerSheet1

Option: PagesPerSheet1
  {
    ID: 11
  }

Option: PagesPerSheet2
  {
    ID: 12
  }

Option: PagesPerSheet4
  {
    ID: 14
  }

Option: PagesPerSheet6
  {
    ID: 16
  }
}
```

FIG. 16

```
Feature: PresentationDirection
{
  Default: RightBottom

Option: RightBottom
  {
    ID: 111
  }

Option: BottomRight
  {
    ID: 112
  }

Option: LeftBottom
  {
    ID: 113
  }

Option: BottomLeft
  {
    ID: 114
  }

Option: RightTop
  {
    ID: 115
  }

Option: TopRight
  {
    ID: 116
  }

Option: LeftTop
  {
    ID: 117
  }

Option: TopLeft
  {
    ID: 118
  }

Option: RightOrBottom
  {
    ID: 311
  }

Option: LeftOrTop
  {
    ID: 312
  }
}
```

FIG. 17

```
Feature: MediaSize
{
   Default: A4

Option: Letter
   {
      ID: 61
   }

Option: Legal
   {
      ID: 62
   }

Option: A4
   {
      ID: 63
   }

Option: B5
   {
      ID: 64
   }

Option: A4Plus
   {
      ID: 281
   }
}
```

FIG. 18

```
Feature: OutputQuality
{
  Default: Automatic

Option: Automatic
  {
    ID: 71
  }

Option: High
  {
    ID: 72
  }

Option: Normal
  {
    ID: 73
  }
}
```

FIG. 19

```
Feature: OutputMediaSize
{
  Default: A4

Option: Letter
  {
    ID: 61
  }

Option: Legal
  {
    ID: 62
  }

Option: A4
  {
    ID: 63
  }

Option: B5
  {
    ID: 64
  }

Option: A4Plus
  {
    ID: 281
  }
}
```

FIG. 20

```
Command: CmdStartJob
{
   Order: JOB_SETUP.1
   CallID:=CMD_ID_STARTJOB
}

Command: CmdStartDoc
{
   Order: DOC_SETUP.1
   CallID:=CMD_ID_STARTDOC
}

Command: CmdStartPage
{
   Order: PAGE_SETUP.1
   CallID:=CMD_ID_STARTPAGE
}

Command: CmdEndPage
{
   Order: PAGE_FINISH.1
   CallID:=CMD_ID_ENDPAGE
}

Command: CmdEndDoc
{
   Order: DOC_FINISH.1
   CallID:=CMD_ID_ENDDOC
}

Command: CmdEndJob
{
   Order: JOB_FINISH.1
   CallID:=CMD_ID_ENDJOB
}

Command: CmdGetPrnProperties
{
   Order: ANY
   CallID:=CMD_ID_GETPRNPROPERTIES
}
```

FIG. 21

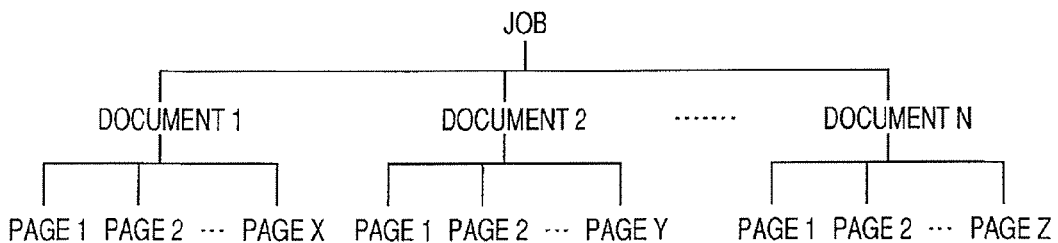

FIG. 22

```
boolean CMD_ID_STARTJOB (PPRINT_MODE pPmMode, void *pData)
{
        MAKE CONTROL AT THE START OF JOB
        AND RETURN ITS RESULT (TRUE OR FALSE)
} boolean CMD_ID_STARTDOC (PPRINT_MODE pPmMode, void *pData)
{
        MAKE CONTROL AT THE START OF DOCUMENT
        AND RETURN ITS RESULT (TRUE OR FALSE)
} boolean CMD_ID_STARTPAGE (PPRINT_MODE pPmMode, void *pData)
{
        MAKE CONTROL AT THE START OF PAGE
        AND RETURN ITS RESULT (TRUE OR FALSE)
} boolean CMD_ID_ENDPAGE (PPRINT_MODE pPmMode, void *pData)
{
        MAKE CONTROL AT THE END OF PAGE
        AND RETURN ITS RESULT (TRUE OR FALSE)
} boolean CMD_ID_ENDDOC (PPRINT_MODE pPmMode, void *pData)
{
        MAKE CONTROL AT THE END OF DOCUMENT
        AND RETURN ITS RESULT (TRUE OR FALSE)
} boolean CMD_ID_ENDJOB (PPRINT_MODE pPmMode, void *pData)
{
        MAKE CONTROL AT THE END OF JOB
        AND RETURN ITS RESULT (TRUE OR FALSE)
} boolean CMD_ID_GETPRNPROPERTIES (PPRINT_MODE pPmMode)
{
        FORM PRINT SETTING INFORMATION AND
        RETURN THE FORMED PRINT SETTING
        INFORMATION AND ITS RESULT (TRUE OR FALSE)
}
```

FIG. 27

```xml
<?xml version="1.0" encoding="UTF-8"?>
<pjsf:PrintJobSchema
        xmlns:pjsf="http://schemas.abc.com/printjobschemaframework"
        xmlns:xsi="http://www.w3.org/2001/XMLSchema-instance"
        xmlns:xsd="http://www.w3.org/2001/XMLSchema" version="1"
        xmlns:pjsk="http://schemas.abc.com/printjobschemakeywords">

<pjsf:ParameterInit name="pjsk:[Range]CopyCount">
                <pjsf:Value xsi:type="xsd:integer"></pjsf:Value>
        </pjsf:ParameterInit>

<pjsf:Feature name="pjsk:[Range]InputBin">
                <pjsf:Property name="pjsk:DisplayName">
                        <pjsf:Value xsi:type="xsd:string">Paper Source</pjsf:Value>
                </pjsf:Property>
                <pjsf:Option name="pjsk:ASF">
                        <pjsf:Property name="pjsk:DisplayName">
                                <pjsf:Value xsi:type="xsd:string">Auto Sheet Feeder</pjsf:Value>
                        </pjsf:Property>
                </pjsf:Option>
                <pjsf:Option name="pjsk:Cassette">
                        <pjsf:Property name="pjsk:DisplayName">
                                <pjsf:Value xsi:type="xsd:string">Cassette</pjsf:Value>
                        </pjsf:Property>
                </pjsf:Option>
                <pjsf:Option name="pjsk:Manual">
                        <pjsf:Property name="pjsk:DisplayName">
                                <pjsf:Value xsi:type="xsd:string">Manual Tray</pjsf:Value>
                        </pjsf:Property>
                </pjsf:Option>
        </pjsf:Feature>
```

FIG. 28

```xml
        <pjsf:Feature name="pjsk:[Range]Orientation">
                <pjsf:Property name="pjsk:DisplayName">
                        <pjsf:Value xsi:type="xsd:string">Orientation</pjsf:Value>
                </pjsf:Property>
                <pjsf:Option name="pjsk:Portrait">
                        <pjsf:Property name="pjsk:DisplayName">
                                <pjsf:Value xsi:type="xsd:string">Portrait</pjsf:Value>
                        </pjsf:Property>
                </pjsf:Option>
                <pjsf:Option name="pjsk:Landscape">
                        <pjsf:Property name="pjsk:DisplayName">
                                <pjsf:Value xsi:type="xsd:string">Landscape</pjsf:Value>
                        </pjsf:Property>
                </pjsf:Option>
        </pjsf:Feature>
```

FIG. 29

```xml
<pjsf:Feature name="pjsk:[Range]OutputColor">
    <pjsf:Property name="pjsk:DisplayName">
        <pjsf:Value xsi:type="xsd:string">Color</pjsf:Value>
    </pjsf:Property>
    <pjsf:Option name="pjsk:Color">
        <pjsf:Property name="pjsk:DisplayName">
            <pjsf:Value xsi:type="xsd:string">Color</pjsf:Value>
        </pjsf:Property>
    </pjsf:Option>
    <pjsf:Option name="pjsk:Grayscale">
        <pjsf:Property name="pjsk:DisplayName">
            <pjsf:Value xsi:type="xsd:string">Grayscale</pjsf:Value>
        </pjsf:Property>
    </pjsf:Option>
    <pjsf:Option name="pjsk:Monochrome">
        <pjsf:Property name="pjsk:DisplayName">
            <pjsf:Value xsi:type="xsd:string">Monochrome</pjsf:Value>
        </pjsf:Property>
    </pjsf:Option>
</pjsf:Feature>
```

FIG. 30

```xml
<pjsf:Feature name="pjsk:[Range]Resolution">
    <pjsf:Property name="pjsk:DisplayName">
        <pjsf:Value xsi:type="xsd:string">Resolution</pjsf:Value>
    </pjsf:Property>
    <pjsf:Option name="pjsk:High">
        <pjsf:Property name="pjsk:ResolutionX">
            <pjsf:Value xsi:type="xsd:integer">600</pjsf:Value>
        </pjsf:Property>
        <pjsf:Property name="pjsk:ResolutionY">
            <pjsf:Value xsi:type="xsd:integer">600</pjsf:Value>
        </pjsf:Property>
        <pjsf:Property name="pjsk:DisplayName">
            <pjsf:Value xsi:type="xsd:string">High</pjsf:Value>
        </pjsf:Property>
    </pjsf:Option>
    <pjsf:Option name="pjsk:Standard">
        <pjsf:Property name="pjsk:ResolutionX">
            <pjsf:Value xsi:type="xsd:integer">300</pjsf:Value>
        </pjsf:Property>
        <pjsf:Property name="pjsk:ResolutionY">
            <pjsf:Value xsi:type="xsd:integer">300</pjsf:Value>
        </pjsf:Property>
        <pjsf:Property name="pjsk:DisplayName">
            <pjsf:Value xsi:type="xsd:string">Standard</pjsf:Value>
        </pjsf:Property>
    </pjsf:Option>
    <pjsf:Option name="pjsk:Draft">
        <pjsf:Property name="pjsk:ResolutionX">
            <pjsf:Value xsi:type="xsd:integer">150</pjsf:Value>
        </pjsf:Property>
        <pjsf:Property name="pjsk:ResolutionY">
            <pjsf:Value xsi:type="xsd:integer">150</pjsf:Value>
        </pjsf:Property>
        <pjsf:Property name="pjsk:DisplayName">
            <pjsf:Value xsi:type="xsd:string">Draft</pjsf:Value>
        </pjsf:Property>
    </pjsf:Option>
</pjsf:Feature>
```

FIG. 31

```
<pjsf:Feature name="pjsk:[Range]MediaType">
    <pjsf:Property name="pjsk:DisplayName">
        <pjsf:Value xsi:type="xsd:string">Media Type</pjsf:Value>
    </pjsf:Property>
    <pjsf:Option name="pjsk:Plain">
        <pjsf:Property name="pjsk:DisplayName">
            <pjsf:Value xsi:type="xsd:string">Plain Paper</pjsf:Value>
        </pjsf:Property>
    </pjsf:Option>
    <pjsf:Option name="pjsk:Photo">
        <pjsf:Property name="pjsk:DisplayName">
            <pjsf:Value xsi:type="xsd:string">Photo Paper</pjsf:Value>
        </pjsf:Property>
    </pjsf:Option>
</pjsf:Feature>
```

FIG. 32

```
<pjsf:Feature name="pjsk:[Range]Duplex">
    <pjsf:Property name="pjsk:DisplayName">
        <pjsf:Value xsi:type="xsd:string">Duplex Printing</pjsf:Value>
    </pjsf:Property>
    <pjsf:Option name="pjsk:OneSided">
        <pjsf:Property name="pjsk:DisplayName">
            <pjsf:Value xsi:type="xsd:string">None</pjsf:Value>
        </pjsf:Property>
    </pjsf:Option>
    <pjsf:Option name="pjsk:TwoSidedLongEdge">
        <pjsf:Property name="pjsk:DisplayName">
            <pjsf:Value xsi:type="xsd:string">Duplex Printing (Long edge)</pjsf:Value>
        </pjsf:Property>
    </pjsf:Option>
    <pjsf:Option name="pjsk:TwoSidedShortEdge">
        <pjsf:Property name="pjsk:DisplayName">
            <pjsf:Value xsi:type="xsd:string">Duplex Printing (Short edge)</pjsf:Value>
        </pjsf:Property>
    </pjsf:Option>
</pjsf:Feature>
```

FIG. 33

```xml
<pjsf:Feature name="pjsk:[Range]NUp">
    <pjsf:Property name="pjsk:DisplayName">
        <pjsf:Value xsi:type="xsd:string">Page Layout Printing</pjsf:Value>
    </pjsf:Property>
    <pjsf:Option name="pjsk:PagesPerSheet1">
        <pjsf:Property name="pjsk:DisplayName">
            <pjsf:Value xsi:type="xsd:string">1-Page Print</pjsf:Value>
        </pjsf:Property>
    </pjsf:Option>
    <pjsf:Option name="pjsk:PagesPerSheet2">
        <pjsf:Property name="pjsk:DisplayName">
            <pjsf:Value xsi:type="xsd:string">2-Page Print</pjsf:Value>
        </pjsf:Property>
    </pjsf:Option>
    <pjsf:Option name="pjsk:PagesPerSheet4">
        <pjsf:Property name="pjsk:DisplayName">
            <pjsf:Value xsi:type="xsd:string">4-Page Print</pjsf:Value>
        </pjsf:Property>
    </pjsf:Option>
    <pjsf:Option name="pjsk:PagesPerSheet6">
        <pjsf:Property name="pjsk:DisplayName">
            <pjsf:Value xsi:type="xsd:string">6-Page Print</pjsf:Value>
        </pjsf:Property>
    </pjsf:Option>
    <pjsf:Option name="pjsk:PagesPerSheet9">
        <pjsf:Property name="pjsk:DisplayName">
            <pjsf:Value xsi:type="xsd:string">9-Page Print</pjsf:Value>
        </pjsf:Property>
    </pjsf:Option>
    <pjsf:Option name="pjsk:PagesPerSheet16">
        <pjsf:Property name="pjsk:DisplayName">
            <pjsf:Value xsi:type="xsd:string">16-Page Print</pjsf:Value>
        </pjsf:Property>
    </pjsf:Option>
```

*FIG. 34*

```xml
<pjsf:Feature name="pjsk:PresentationDirection">
    <pjsf:Property name="pjsk:DisplayName">
        <pjsf:Value xsi:type="xsd:string">Page Order</pjsf:Value>
    </pjsf:Property>
    <pjsf:Option name="pjsk:RightBottom">
        <pjsf:Property name="pjsk:DisplayName">
            <pjsf:Value xsi:type="xsd:string">Horizontally from top left to
                bottom right</pjsf:Value>
        </pjsf:Property>
    </pjsf:Option>
    <pjsf:Option name="pjsk:BottomRight">
        <pjsf:Property name="pjsk:DisplayName">
            <pjsf:Value xsi:type="xsd:string">Vertically from top left to
                bottom right</pjsf:Value>
        </pjsf:Property>
    </pjsf:Option>
    <pjsf:Option name="pjsk:LeftBottom">
        <pjsf:Property name="pjsk:DisplayName">
            <pjsf:Value xsi:type="xsd:string">Horizontally from top right to
                bottom left</pjsf:Value>
        </pjsf:Property>
    </pjsf:Option>
    <pjsf:Option name="pjsk:BottomLeft">
        <pjsf:Property name="pjsk:DisplayName">
            <pjsf:Value xsi:type="xsd:string">Vertically from top right to
                bottom left</pjsf:Value>
        </pjsf:Property>
    </pjsf:Option>
    <pjsf:Option name="pjsk:RightTop">
        <pjsf:Property name="pjsk:DisplayName">
            <pjsf:Value xsi:type="xsd:string">Horizontally from bottom left to
                top right</pjsf:Value>
        </pjsf:Property>
    </pjsf:Option>
    <pjsf:Option name="pjsk:TopRight">
        <pjsf:Property name="pjsk:DisplayName">
            <pjsf:Value xsi:type="xsd:string">Vertically from bottom left to
                top right</pjsf:Value>
        </pjsf:Property>
    </pjsf:Option>
```

FIG. 35

```xml
<pjsf:Option name="pjsk:LeftTop">
    <pjsf:Property name="pjsk:DisplayName">
        <pjsf:Value xsi:type="xsd:string">Horizontally from bottom right to
            top left</pjsf:Value>
    </pjsf:Property>
</pjsf:Option>
<pjsf:Option name="pjsk:TopLeft">
    <pjsf:Property name="pjsk:DisplayName">
        <pjsf:Value xsi:type="xsd:string">Vertically from bottom right to
            top left</pjsf:Value>
    </pjsf:Property>
</pjsf:Option>
    </pjsf:Feature>
</pjsf:Feature>
```

FIG. 36

```xml
<pjsf:Feature name="pjsk:[Range]MediaSize">
    <pjsf:Property name="pjsk:DisplayName">
        <pjsf:Value xsi:type="xsd:string">Paper Size</pjsf:Value>
    </pjsf:Property>
    <pjsf:Option name="pjsk:Letter">
        <pjsf:Property name="pjsk:DisplayName">
            <pjsf:Value xsi:type="xsd:string">Letter (216x279mm)</pjsf:Value>
        </pjsf:Property>
    </pjsf:Option>
    <pjsf:Option name="pjsk:Legal">
        <pjsf:Property name="pjsk:DisplayName">
            <pjsf:Value xsi:type="xsd:string">Legal (216x356mm)</pjsf:Value>
        </pjsf:Property>
    </pjsf:Option>
    <pjsf:Option name="pjsk:A5">
        <pjsf:Property name="pjsk:DisplayName">
            <pjsf:Value xsi:type="xsd:string">A5 (148x210mm)</pjsf:Value>
        </pjsf:Property>
    </pjsf:Option>
    <pjsf:Option name="pjsk:A4">
        <pjsf:Property name="pjsk:DisplayName">
            <pjsf:Value xsi:type="xsd:string">A4 (210x297mm)</pjsf:Value>
        </pjsf:Property>
    </pjsf:Option>
    <pjsf:Option name="pjsk:B5">
        <pjsf:Property name="pjsk:DisplayName">
            <pjsf:Value xsi:type="xsd:string">B5 (182x257mm)</pjsf:Value>
        </pjsf:Property>
    </pjsf:Option>
    <pjsf:Option name="pjsk:Photo8x10">
        <pjsf:Property name="pjsk:DisplayName">
            <pjsf:Value xsi:type="xsd:string">Photo (203x254mm)</pjsf:Value>
        </pjsf:Property>
    </pjsf:Option>
</pjsf:Feature>
```

FIG. 37

```xml
<pjsf:Feature name="pjsk:[Range]OutputQuality">
    <pjsf:Property name="pjsk:DisplayName">
        <pjsf:Value xsi:type="xsd:string">Print Quality</pjsf:Value>
    </pjsf:Property>
    <pjsf:Option name="pjsk:Automatic">
        <pjsf:Property name="pjsk:DisplayName">
            <pjsf:Value xsi:type="xsd:string">Auto</pjsf:Value>
        </pjsf:Property>
    </pjsf:Option>
    <pjsf:Option name="pjsk:High">
        <pjsf:Property name="pjsk:DisplayName">
            <pjsf:Value xsi:type="xsd:string">High</pjsf:Value>
        </pjsf:Property>
    </pjsf:Option>
    <pjsf:Option name="pjsk:Normal">
        <pjsf:Property name="pjsk:DisplayName">
            <pjsf:Value xsi:type="xsd:string">Standard</pjsf:Value>
        </pjsf:Property>
    </pjsf:Option>
    <pjsf:Option name="pjsk:Draft">
        <pjsf:Property name="pjsk:DisplayName">
            <pjsf:Value xsi:type="xsd:string">Draft</pjsf:Value>
        </pjsf:Property>
    </pjsf:Option>
</pjsf:Feature>
```

FIG. 38

```xml
<pjsf:Feature name="pjsk:[Range]OutputMediaSize">
    <pjsf:Property name="pjsk:DisplayName">
        <pjsf:Value xsi:type="xsd:string"> PRINTER Paper Size</pjsf:Value>
    </pjsf:Property>
    <pjsf:Option name="pjsk:Letter">
        <pjsf:Property name="pjsk:DisplayName">
            <pjsf:Value xsi:type="xsd:string">Letter (216x279mm)</pjsf:Value>
        </pjsf:Property>
    </pjsf:Option>
    <pjsf:Option name="pjsk:Legal">
        <pjsf:Property name="pjsk:DisplayName">
            <pjsf:Value xsi:type="xsd:string">Legal (216x356mm)</pjsf:Value>
        </pjsf:Property>
    </pjsf:Option>
    <pjsf:Option name="pjsk:A5">
        <pjsf:Property name="pjsk:DisplayName">
            <pjsf:Value xsi:type="xsd:string">A5 (148x210mm)</pjsf:Value>
        </pjsf:Property>
    </pjsf:Option>
    <pjsf:Option name="pjsk:A4">
        <pjsf:Property name="pjsk:DisplayName">
            <pjsf:Value xsi:type="xsd:string">A4 (210x297mm)</pjsf:Value>
        </pjsf:Property>
    </pjsf:Option>
    <pjsf:Option name="pjsk:B5">
        <pjsf:Property name="pjsk:DisplayName">
            <pjsf:Value xsi:type="xsd:string">B5 (182x257mm)</pjsf:Value>
        </pjsf:Property>
    </pjsf:Option>
    <pjsf:Option name="pjsk:Photo8x10">
        <pjsf:Property name="pjsk:DisplayName">
            <pjsf:Value xsi:type="xsd:string">Photo (203x254mm)</pjsf:Value>
        </pjsf:Property>
    </pjsf:Option>
</pjsf:Feature>
</pjsf:PrintJobSchema>
```

FIG. 39

ModelName: "Koichi KMMN"
PrintSchemaPrivateNamespaceURI: "http://www.koichi.com/ns/printjobschema/inkjet/v100"

Feature: PrintJobInputBin
{
  Default: ASF
  PrintJobSchemaKeywordMap: "PrintJobInputBin"

Option: ASF
  {
    ID: 7
    PrintJobSchemaKeywordMap: "ASF"
  }

Option: Cassette
  {
    ID: 267
    PrintJobSchemaKeywordMap: "Cassette"
  }
}

FIG. 40

Feature: PrintPageOrientation
{
  Default: Portrait
  PrintJobSchemaKeywordMap: "PrintPageOrientation"

Option: Portrait
  {
    ID: 21
    PrintJobSchemaKeywordMap: "Portrait"
  }

Option: Landscape
  {
    ID: 22
    PrintJobSchemaKeywordMap: "Landscape"
  }
}

FIG. 41

```
Feature: PrintPageOutputColor
{
  Default: Color
  PrintJobSchemaKeywordMap: "PrintPageOutputColor"

Option: Color
  {
    ID: 31
    PrintJobSchemaKeywordMap: "Color"
  }

Option: Monochrome
  {
    ID: 33
    PrintJobSchemaKeywordMap: "Monochrome"
  }
}
```

FIG. 42

```
Feature: PrintPageResolution
{
  Default: Standard
  PrintJobSchemaKeywordMap: "PrintPageResolution"

Option: High
  {
    ID: -4
    DPI: (600, 600)
    PrintJobSchemaKeywordMap: "High"
  }

Option: Standard
  {
    ID: -3
    DPI: (300, 300)
    PrintJobSchemaKeywordMap: "Standard"
  }
}
```

FIG. 43

```
Feature: PrintPageMediaType
{
  Default: Plain
  PrintJobSchemaKeywordMap: "PrintPageMediaType"

Option: Plain
  {
    ID: 1
    PrintJobSchemaKeywordMap: "PlainPaper"
  }

Option: Photo
  {
    ID: 2
    PrintJobSchemaKeywordMap: "Photo"
  }

Option: ProPhoto
  {
    ID: 285
    PrintJobSchemaKeywordMap: "ProPhoto"
  }
}
```

FIG. 44

```
Feature: PrintJobDuplex
{
  Default: OneSided
  PrintJobSchemaKeywordMap: "PrintJobDuplex"

Option: OneSided
  {
    ID: 51
    PrintJobSchemaKeywordMap: "OneSided"
  }

Option: TwoSidedLongEdge
  {
    ID: 52
    PrintJobSchemaKeywordMap: "TwoSidedLongEdge"
  }

Option: TwoSidedShortEdge
  {
    ID: 53
    PrintJobSchemaKeywordMap: "TwoSidedShortEdge"
  }
}
```

FIG. 45

```
Feature: PrintJobNUp
{
  Default: PagesPerSheet1
  PrintJobSchemaKeywordMap: "PrintJobNUp"

Option: PagesPerSheet1
  {
    ID: 11
    PrintJobSchemaKeywordMap: "PagesPerSheet1"
  }

Option: PagesPerSheet2
  {
    ID: 12
    PrintJobSchemaKeywordMap: "PagesPerSheet2"
  }

Option: PagesPerSheet4
  {
    ID: 14
    PrintJobSchemaKeywordMap: "PagesPerSheet4"
  }

Option: PagesPerSheet6
  {
    ID: 16
    PrintJobSchemaKeywordMap: "PagesPerSheet6"
  }
}
```

FIG. 46

```
Feature: PrintJobPresentationDirection
{
  Default: RightBottom
  PrintJobSchemaKeywordMap: "PrintJobPresentationDirection"

Option: RightBottom
  {
    ID: 111
    PrintJobSchemaKeywordMap: "RightBottom"
  }

Option: BottomRight
  {
    ID: 112
    PrintJobSchemaKeywordMap: "BottomRight"
  }

Option: LeftBottom
  {
    ID: 113
    PrintJobSchemaKeywordMap: "LeftBottom"
  }

Option: BottomLeft
  {
    ID: 114
    PrintJobSchemaKeywordMap: "BottomLeft"
  }

Option: RightTop
  {
    ID: 115
    PrintJobSchemaKeywordMap: "RightTop"
  }

Option: TopRight
  {
    ID: 116
    PrintJobSchemaKeywordMap: "TopRight"
  }

Option: LeftTop
  {
    ID: 117
    PrintJobSchemaKeywordMap: "LeftTop"
  }
```

FIG. 47

```
Option: TopLeft
{
   ID: 118
   PrintJobSchemaKeywordMap: "TopLeft"
}

Option: RightOrBottom
{
   ID: 311
   PrintJobSchemaKeywordMap: "RightOrBottom"
}

Option: LeftOrTop
{
   ID: 312
   PrintJobSchemaKeywordMap: "LeftOrTop"
}
}
```

FIG. 48

```
Feature: PrintPageMediaSize
{
  Default: A4
  PrintJobSchemaKeywordMap: "PrintPageMediaSize"

Option: Letter
  {
    ID: 61
    PrintJobSchemaKeywordMap: "Letter"
  }

Option: Legal
  {
    ID: 62
    PrintJobSchemaKeywordMap: "Legal"
  }

Option: A4
  {
    ID: 63
    PrintJobSchemaKeywordMap: "A4"
  }

Option: B5
  {
    ID: 64
    PrintJobSchemaKeywordMap: "B5"
  }

Option: A4Plus
  {
    ID: 281
    PrintJobSchemaKeywordMap: "A4Plus"
  }
}
```

FIG. 49

```
Feature: PrintPageOutputQuality
{
  Default: Automatic
  PrintJobSchemaKeywordMap: "PageOutputQuality"

Option: Automatic
  {
    ID: 71
    PrintJobSchemaKeywordMap: "Automatic"
  }

Option: High
  {
    ID: 72
    PrintJobSchemaKeywordMap: "High"
  }

Option: Normal
  {
    ID: 73
    PrintJobSchemaKeywordMap: "Normal"
  }
}
```

FIG. 50

```
Feature: PrintPageOutputMediaSize
{
  Default: A4
  PrintJobSchemaKeywordMap: "PrintPageOutputMediaSize"

Option: Letter
  {
    ID: 61
    PrintJobSchemaKeywordMap: "Letter"
  }

Option: Legal
  {
    ID: 62
    PrintJobSchemaKeywordMap: "Legal"
  }

Option: A4
  {
    ID: 63
    PrintJobSchemaKeywordMap: "A4"
  }

Option: B5
  {
    ID: 64
    PrintJobSchemaKeywordMap: "B5"
  }

Option: A4Plus
  {
    ID: 281
    PrintJobSchemaKeywordMap: "A4Plus"
  }
}
```

FIG. 51

```
Command: CmdStartJob
{
  Order: JOB_SETUP.1
  CallID:=CMD_ID_STARTJOB
}

Command: CmdStartDoc
{
  Order: DOC_SETUP.1
  CallID:=CMD_ID_STARTDOC
}

Command: CmdStartPage
{
  Order: PAGE_SETUP.1
  CallID:=CMD_ID_STARTPAGE
}

Command: CmdEndPage
{
  Order: PAGE_FINISH.1
  CallID:=CMD_ID_ENDPAGE
}

Command: CmdEndDoc
{
  Order: DOC_FINISH.1
  CallID:=CMD_ID_ENDDOC
}

Command: CmdEndJob
{
  Order: JOB_FINISH.1
  CallID:=CMD_ID_ENDJOB
}

Command: CmdGetPrnProperties
{
  Order: ANY
  CallID:=CMD_ID_GETPRNPROPERTIES
}

Command: CmdGetPrnJobCaps
{
  Order: ANY
  CallID:=CMD_ID_GETPRNJOBCAPS
}
```

FIG. 52

```
boolean CMD_ID_STARTJOB (PPRINT_MODE pPmMode, void *pData, char *pPJTicket)
{
    MAKE CONTROL AT THE START OF JOB AND RETURN ITS RESULT (TRUE OR FALSE)
} boolean CMD_ID_STARTDOC (PPRINT_MODE pPmMode, void *pData, char *pPJTicket)
{
    MAKE CONTROL AT THE START OF DOCUMENT AND RETURN ITS RESULT (TRUE OR FALSE)
} boolean CMD_ID_STARTPAGE (PPRINT_MODE pPmMode, void *pData, char *pPJTicket)
{
    MAKE CONTROL AT THE START OF PAGE AND RETURN ITS RESULT (TRUE OR FALSE)
} boolean CMD_ID_ENDPAGE (PPRINT_MODE pPmMode, void *pData, char *pPJTicket)
{
    MAKE CONTROL AT THE END OF PAGE AND RETURN ITS RESULT (TRUE OR FALSE)
} boolean CMD_ID_ENDDOC (PPRINT_MODE pPmMode, void *pData, char *pPJTicket)
{
    MAKE CONTROL AT THE END OF DOCUMENT AND RETURN ITS RESULT (TRUE OR FALSE)
} boolean CMD_ID_ENDJOB (PPRINT_MODE pPmMode, void *pData, char *pPJTicket)
{
    MAKE CONTROL AT THE END OF JOB AND RETURN ITS RESULT (TRUE OR FALSE)
} boolean CMD_ID_GETPRNPROPERTIES (PPRINT_MODE pPmMode)
{
    LOAD THE SET PRINT SETTING INFORMATION AND RETURN ITS RESULT (TRUE OR FALSE)
} boolean CMD_ID_GETPRNJOBCAPS (PPRINT_MODE pPmMode, char *pPJCaps)
{
    LOAD THE SET PRINT SETTING INFORMATION,
    MAKE CONTROL OF PRINT JOB CAPABILITY (PRINTJOBCAPABILITIES),
    AND RETURN ITS RESULT (TRUE OR FALSE)
}
```

FIG. 54

```
<pjsf:Feature name="psk:PrintJobNUp">
</pjsf:Feature>
<pjsf:Feature name="ns1:PrintJobPresentationDirection">
        <pjsf:Option name="ns1:RightBottom">
                <pjsf:Property name="ns1:DisplayName">
                        <pjsf:Value xsi:type="xsd:string">Horizontally from top left to bottom right</pjsf:Value>
                </pjsf:Property>
        </pjsf:Option>
</pjsf:Feature>
```

FIG. 55

```
<pjsf:Feature name="psk:PrintJobNUp">
        <pjsf:Feature name="ns1:PresentationDirection">
                <pjsf:Option name="ns1:RightBottom">
                        <pjsf:Property name="ns1:DisplayName">
                                <pjsf:Value xsi:type="xsd:string">Horizontally from top left to
                                        bottom right</pjsf:Value>
                        </pjsf:Property>
                </pjsf:Option>
        </pjsf:Feature>
</pjsf:Feature>
```

FIG. 56

```
<pjsf:Feature name="pjsk:PrintJobNUp">
        <pjsf:Feature name="pjsk:PresentationDirection">
                <pjsf:Option name="pjsk:RightBottom">
                        <pjsf:Property name="pjsk:DisplayName">
                                <pjsf:Value xsi:type="xsd:string">Horizontally from top left to
                                        bottom right</pjsf:Value>
                        </pjsf:Property>
                </pjsf:Option>
        </pjsf:Feature>
</pjsf:Feature>
```

FIG. 57

```xml
<?xml version="1.0" encoding="UTF-8"?>
<pjsf:PrintJobCapabilities
        xmlns:pjsf="http://schemas.abe.com/printjobschemaframework"
        xmlns:xsi="http://www.w3.org/2001/XMLSchema-instance"
        xmlns:xsd="http://www.w3.org/2001/XMLSchema" version="1"
        xmlns:ns1="http://www.koichi.com/ns/printjobschema/inkjet/v100"
        xmlns:pjsk="http://schemas.abe.com/printjobschemakeywords">

<pjsf:Feature name="pjsk:PrintJobInputBin">
                <pjsf:Property name="pjsk:DisplayName">
                        <pjsf:Value xsi:type="xsd:string">Paper Source</pjsf:Value>
                </pjsf:Property>
                <pjsf:Option name="pjsk:ASF">
                        <pjsf:Property name="pjsk:DisplayName">
                                <pjsf:Value xsi:type="xsd:string">Auto Sheet Feeder</pjsf:Value>
                        </pjsf:Property>
                </pjsf:Option>
                <pjsf:Option name="pjsk:Cassette">
                        <pjsf:Property name="pjsk:DisplayName">
                                <pjsf:Value xsi:type="xsd:string">Cassette</pjsf:Value>
                        </pjsf:Property>
                </pjsf:Option>
        </pjsf:Feature>
```

FIG. 58

```xml
<pjsf:Feature name="pjsk:PrintPageOrientation">
        <pjsf:Property name="pjsk:DisplayName">
                <pjsf:Value xsi:type="xsd:string">Orientation</pjsf:Value>
        </pjsf:Property>
        <pjsf:Option name="pjsk:Portrait">
                <pjsf:Property name="pjsk:DisplayName">
                        <pjsf:Value xsi:type="xsd:string">Portrait</pjsf:Value>
                </pjsf:Property>
        </pjsf:Option>
        <pjsf:Option name="pjsk:Landscape">
                <pjsf:Property name="pjsk:DisplayName">
                        <pjsf:Value xsi:type="xsd:string">Landscape</pjsf:Value>
                </pjsf:Property>
        </pjsf:Option>
</pjsf:Feature>
```

FIG. 59

```xml
<pjsf:Feature name="pjsk:PrintPageOutputColor">
    <pjsf:Property name="pjsk:DisplayName">
        <pjsf:Value xsi:type="xsd:string">Color</pjsf:Value>
    </pjsf:Property>
    <pjsf:Option name="pjsk:Color">
        <pjsf:Property name="pjsk:DisplayName">
            <pjsf:Value xsi:type="xsd:string">Color</pjsf:Value>
        </pjsf:Property>
    </pjsf:Option>
    <pjsf:Option name="pjsk:Monochrome">
        <pjsf:Property name="pjsk:DisplayName">
            <pjsf:Value xsi:type="xsd:string">Monochrome</pjsf:Value>
        </pjsf:Property>
    </pjsf:Option>
</pjsf:Feature>
```

FIG. 60

```xml
<pjsf:Feature name="pjsk:PrintPageResolution">
    <pjsf:Property name="pjsk:DisplayName">
        <pjsf:Value xsi:type="xsd:string">Resolution</pjsf:Value>
    </pjsf:Property>
    <pjsf:Option name="pjsk:High">
        <pjsf:Property name="pjsk:ResolutionX">
            <pjsf:Value xsi:type="xsd:integer">600</pjsf:Value>
        </pjsf:Property>
        <pjsf:Property name="pjsk:ResolutionY">
            <pjsf:Value xsi:type="xsd:integer">600</pjsf:Value>
        </pjsf:Property>
        <pjsf:Property name="pjsk:DisplayName">
            <pjsf:Value xsi:type="xsd:string">High</pjsf:Value>
        </pjsf:Property>
    </pjsf:Option>
    <pjsf:Option name="pjsk:Standard">
        <pjsf:Property name="pjsk:ResolutionX">
            <pjsf:Value xsi:type="xsd:integer">300</pjsf:Value>
        </pjsf:Property>
        <pjsf:Property name="pjsk:ResolutionY">
            <pjsf:Value xsi:type="xsd:integer">300</pjsf:Value>
        </pjsf:Property>
        <pjsf:ScoredProperty name="pjsk:QualitativeResolution"><pjsf:Value xsi:type="xsd:QName">pjsk:Normal</pjsf:Value></pjsf:ScoredProperty>
        <pjsf:Property name="pjsk:DisplayName">
            <pjsf:Value xsi:type="xsd:string">Standard</pjsf:Value>
        </pjsf:Property>
    </pjsf:Option>
</pjsf:Feature>
```

FIG. 61

```xml
<pjsf:Feature name="pjsk:PrintPageMediaType">
    <pjsf:Property name="pjsk:DisplayName">
        <pjsf:Value xsi:type="xsd:string">Media Type</pjsf:Value>
    </pjsf:Property>
    <pjsf:Option name="pjsk:Plain">
        <pjsf:Property name="pjsk:DisplayName">
            <pjsf:Value xsi:type="xsd:string">Plain Paper</pjsf:Value>
        </pjsf:Property>
    </pjsf:Option>
    <pjsf:Option name="pjsk:Photo">
        <pjsf:Property name="pjsk:DisplayName">
            <pjsf:Value xsi:type="xsd:string">Photo Paper</pjsf:Value>
        </pjsf:Property>
    </pjsf:Option>
    <pjsf:Option name="ns1:ProPhoto">
        <pjsf:Property name="pjsk:DisplayName">
            <pjsf:Value xsi:type="xsd:string">Professional Photo Paper</pjsf:Value>
        </pjsf:Property>
    </pjsf:Option>
</pjsf:Feature>
```

FIG. 62

```xml
<pjsf:Feature name="pjsk:PrintJobDuplex">
    <pjsf:Property name="pjsk:DisplayName">
        <pjsf:Value xsi:type="xsd:string">Duplex Printing</pjsf:Value>
    </pjsf:Property>
    <pjsf:Option name="pjsk:OneSided">
        <pjsf:Property name="pjsk:DisplayName">
            <pjsf:Value xsi:type="xsd:string">None</pjsf:Value>
        </pjsf:Property>
    </pjsf:Option>
    <pjsf:Option name="pjsk:TwoSidedLongEdge">
        <pjsf:Property name="pjsk:DisplayName">
            <pjsf:Value xsi:type="xsd:string">Duplex Printing</pjsf:Value>
        </pjsf:Property>
    </pjsf:Option>
    <pjsf:Option name="pjsk:TwoSidedShortEdge">
        <pjsf:Property name="pjsk:DisplayName">
            <pjsf:Value xsi:type="xsd:string">Duplex Printing</pjsf:Value>
        </pjsf:Property>
    </pjsf:Option>
</pjsf:Feature>
```

FIG. 63

```xml
<pjsf:Feature name="pjsk:PrintJobNUp">
    <pjsf:Property name="pjsk:DisplayName">
        <pjsf:Value xsi:type="xsd:string">Page Layout Printing</pjsf:Value>
    </pjsf:Property>
    <pjsf:Option name="pjsk:PagesPerSheet1">
        <pjsf:Property name="pjsk:DisplayName">
            <pjsf:Value xsi:type="xsd:string">1-Page Print</pjsf:Value>
        </pjsf:Property>
    </pjsf:Option>
    <pjsf:Option name="pjsk:PagesPerSheet2">
        <pjsf:Property name="pjsk:DisplayName">
            <pjsf:Value xsi:type="xsd:string">2-Page Print</pjsf:Value>
        </pjsf:Property>
    </pjsf:Option>
    <pjsf:Option name="pjsk:PagesPerSheet4">
        <pjsf:Property name="pjsk:DisplayName">
            <pjsf:Value xsi:type="xsd:string">4-Page Print</pjsf:Value>
        </pjsf:Property>
    </pjsf:Option>
    <pjsf:Option name="pjsk:PagesPerSheet6">
        <pjsf:Property name="pjsk:DisplayName">
            <pjsf:Value xsi:type="xsd:string">6-Page Print</pjsf:Value>
        </pjsf:Property>
    </pjsf:Option>
<pjsf:Feature name="pjsk:PresentationDirection">
    <pjsf:Property name="pjsk:DisplayName">
        <pjsf:Value xsi:type="xsd:string">Page Order</pjsf:Value>
    </pjsf:Property>
    <pjsf:Option name="pjsk:RightBottom">
        <pjsf:Property name="pjsk:DisplayName">
            <pjsf:Value xsi:type="xsd:string">Horizontally from top left to
                bottom right</pjsf:Value>
        </pjsf:Property>
    </pjsf:Option>
    <pjsf:Option name="pjsk:BottomRight">
        <pjsf:Property name="pjsk:DisplayName">
            <pjsf:Value xsi:type="xsd:string">Vertically from top left to
                bottom right</pjsf:Value>
        </pjsf:Property>
    </pjsf:Option>
    <pjsf:Option name="pjsk:LeftBottom">
        <pjsf:Property name="pjsk:DisplayName">
            <pjsf:Value xsi:type="xsd:string">Horizontally from top right to
                bottom left</pjsf:Value>
        </pjsf:Property>
    </pjsf:Option>
    <pjsf:Option name="pjsk:BottomLeft">
        <pjsf:Property name="pjsk:DisplayName">
            <pjsf:Value xsi:type="xsd:string">Vertically from top right to
                bottom left</pjsf:Value>
        </pjsf:Property>
    </pjsf:Option>
```

FIG. 64

```xml
<pjsf:Option name="pjsk:RightTop">
    <pjsf:Property name="pjsk:DisplayName">
        <pjsf:Value xsi:type="xsd:string">Horizontally from bottom left to
            top right</pjsf:Value>
    </pjsf:Property>
</pjsf:Option>
<pjsf:Option name="pjsk:TopRight">
    <pjsf:Property name="pjsk:DisplayName">
        <pjsf:Value xsi:type="xsd:string">Vertically from bottom left to
            top right</pjsf:Value>
    </pjsf:Property>
</pjsf:Option>
<pjsf:Option name="pjsk:LeftTop">
    <pjsf:Property name="pjsk:DisplayName">
        <pjsf:Value xsi:type="xsd:string">Horizontally from bottom right to
            top left</pjsf:Value>
    </pjsf:Property>
</pjsf:Option>
<pjsf:Option name="pjsk:TopLeft">
    <pjsf:Property name="pjsk:DisplayName">
        <pjsf:Value xsi:type="xsd:string">Vertically from bottom right to
            top left</pjsf:Value>
    </pjsf:Property>
</pjsf:Option>
<pjsf:Option name="ns1:RightOrBottom">
    <pjsf:Property name="pjsk:DisplayName">
        <pjsf:Value xsi:type="xsd:string">Left to right or Top to
            bottom</pjsf:Value>
    </pjsf:Property>
</pjsf:Option>
<pjsf:Option name="ns1:LeftOrTop">
    <pjsf:Property name="pjsk:DisplayName">
        <pjsf:Value xsi:type="xsd:string">Right to left or Bottom to
            top</pjsf:Value>
    </pjsf:Property>
</pjsf:Option>
        </pjsf:Feature>
</pjsf:Feature>
```

FIG. 65

```xml
<pjsf:Feature name="pjsk:PrintPageMediaSize">
    <pjsf:Property name="pjsk:DisplayName">
        <pjsf:Value xsi:type="xsd:string">Paper Size</pjsf:Value>
    </pjsf:Property>
    <pjsf:Option name="pjsk:Letter">
        <pjsf:Property name="pjsk:DisplayName">
            <pjsf:Value xsi:type="xsd:string">Letter (216x279mm)</pjsf:Value>
        </pjsf:Property>
    </pjsf:Option>
    <pjsf:Option name="pjsk:Legal">
        <pjsf:Property name="pjsk:DisplayName">
            <pjsf:Value xsi:type="xsd:string">Legal (216x356mm)</pjsf:Value>
        </pjsf:Property>
    </pjsf:Option>
    <pjsf:Option name="pjsk:A4">
        <pjsf:Property name="pjsk:DisplayName">
            <pjsf:Value xsi:type="xsd:string">A4 (210x297mm)</pjsf:Value>
        </pjsf:Property>
    </pjsf:Option>
    <pjsf:Option name="pjsk:B5">
        <pjsf:Property name="pjsk:DisplayName">
            <pjsf:Value xsi:type="xsd:string">B5 (182x257mm)</pjsf:Value>
        </pjsf:Property>
    </pjsf:Option>
    <pjsf:Option name="ns1:A4Plus">
        <pjsf:Property name="pjsk:DisplayName">
            <pjsf:Value xsi:type="xsd:string">A4+ (223x356mm)</pjsf:Value>
        </pjsf:Property>
    </pjsf:Option>
</pjsf:Feature>
```

FIG. 66

```xml
<pjsf:Feature name="pjsk:PrintPageOutputQuality">
    <pjsf:Property name="pjsk:DisplayName">
        <pjsf:Value xsi:type="xsd:string">Print Quality</pjsf:Value>
    </pjsf:Property>
    <pjsf:Option name="pjsk:Automatic">
        <pjsf:Property name="pjsk:DisplayName">
            <pjsf:Value xsi:type="xsd:string">Auto</pjsf:Value>
        </pjsf:Property>
    </pjsf:Option>
    <pjsf:Option name="pjsk:High">
        <pjsf:Property name="pjsk:DisplayName">
            <pjsf:Value xsi:type="xsd:string">High</pjsf:Value>
        </pjsf:Property>
    </pjsf:Option>
    <pjsf:Option name="pjsk:Normal">
        <pjsf:Property name="pjsk:DisplayName">
            <pjsf:Value xsi:type="xsd:string">Standard</pjsf:Value>
        </pjsf:Property>
    </pjsf:Option>
</pjsf:Feature>
```

FIG. 67

```xml
<pjsf:Feature name="pjsk:PrintPageOutputMediaSize">
    <pjsf:Property name="pjsk:DisplayName">
        <pjsf:Value xsi:type="xsd:string"> PRINTER Paper Size</pjsf:Value>
    </pjsf:Property>
    <pjsf:Option name="pjsk:Letter">
        <pjsf:Property name="pjsk:DisplayName">
            <pjsf:Value xsi:type="xsd:string">Letter (216x279mm)</pjsf:Value>
        </pjsf:Property>
    </pjsf:Option>
    <pjsf:Option name="pjsk:Legal">
        <pjsf:Property name="pjsk:DisplayName">
            <pjsf:Value xsi:type="xsd:string">Legal (216x356mm)</pjsf:Value>
        </pjsf:Property>
    </pjsf:Option>
    <pjsf:Option name="pjsk:A4">
        <pjsf:Property name="pjsk:DisplayName">
            <pjsf:Value xsi:type="xsd:string">A4 (210x297mm)</pjsf:Value>
        </pjsf:Property>
    </pjsf:Option>
    <pjsf:Option name="pjsk:B5">
        <pjsf:Property name="pjsk:DisplayName">
            <pjsf:Value xsi:type="xsd:string">B5 (182x257mm)</pjsf:Value>
        </pjsf:Property>
    </pjsf:Option>
    <pjsf:Option name="ns1:A4Plus">
        <pjsf:Property name="pjsk:DisplayName">
            <pjsf:Value xsi:type="xsd:string">A4+ (223x356mm)</pjsf:Value>
        </pjsf:Property>
    </pjsf:Option>
</pjsf:Feature>
</pjsf:PrintJobCapabilities>
```

INFORMATION PROCESSING APPARATUS AND PERIPHERAL APPARATUS CONTROL METHOD

BACKGROUND OF THE INVENTION

1. Field of the Invention

The present invention relates to an information processing apparatus and a peripheral apparatus control method.

2. Description of the Related Art

In recent years, a print system has been proposed using a print setting file (GPD) of a text format in which information regarding print settings has been described by an expression of a non-hierarchical structure and a print control structure (DEVMODE structure) constructed by members of a single hierarchic structure. Such a print system has been installed in the OS (Operating System) or the like such as Windows (registered trademark) XP or the like. In such a print system, a printer driver called "Unidrv" as a standard of the Windows (registered trademark) XP OS is used.

There are a Printer Device V1.0 and a Printer Basic Service V1.0 which have been standardized in the UPnP Forum™. A print system has also been proposed using print setting job information (there is a case where it is abbreviated to a "job ticket" hereinbelow) of an XML format in which information regarding print settings and a print job are described by an expression of a hierarchical structure. Such a print system has been installed in the OS such as Windows (registered trademark) XP or the like.

In such a print system, a service having a proxy server function for print control is activated on the OS. A network corresponding printer or the like which does not have a UPnP function is used by using a printer driver for controlling the Printer Device V1.0 and Printer Basic Service V1.0 of UPnP through such a service.

There is a Patent Document 1 (Japanese Patent Application Laid-Open No. H10-275064).

In recent years, a peripheral apparatus control system has been considered in which a print system using the print setting files and the print control structure and a print system using the job ticket are integrated. In such a peripheral apparatus control system (integrated print system), an architecture of the former print system is used as a base and the latter print system is constructed thereon.

In this case, there is needed a process for the Unidrv to convert the print setting file of the text format in which the information regarding the print settings has been described by the expression of the non-hierarchical structure into the print setting job information of the XML format in which the information regarding the print settings and the print job has been described by the expression of the hierarchical structure.

However, there is such a problem that it is difficult to efficiently and accurately form the job ticket of the hierarchical structure from the print setting file of the non-hierarchical structure.

SUMMARY OF THE INVENTION

The invention is made in consideration of the above problems and it is an object of the invention to efficiently and accurately form a job ticket of a hierarchical structure from a print setting file of a non-hierarchical structure.

Further, another object of the invention is to efficiently form a job ticket including a specific setting irrespective of limited specifications of an OS.

According to the invention, therefore, there is provided an information processing apparatus comprising: a peripheral apparatus control unit adapted to control a peripheral apparatus; and an operation control unit adapted to control an operation in the peripheral apparatus by using operation instructing information regarding the operation in the peripheral apparatus, wherein the peripheral apparatus control unit forms first operation instructing information having a non-hierarchical structure from operation setting information regarding the operation and forms second operation instructing information having a hierarchical structure from the formed first operation instructing information.

Further features of the present invention will become apparent from the following description of exemplary embodiments with reference to the attached drawings.

BRIEF DESCRIPTION OF THE DRAWINGS

FIG. 7 is a diagram illustrating a print setting dialog of a printer driver 50.

FIG. 8 is a diagram illustrating a print control structure.

FIG. 9 is a diagram illustrating information regarding a sheet feeding method in a print setting file.

FIG. 10 is a diagram illustrating information regarding a print orientation in the print setting file.

FIG. 11 is a diagram illustrating information regarding a color printing method in the print setting file.

FIG. 12 is a diagram illustrating information regarding resolution in the print setting file.

FIG. 13 is a diagram illustrating information regarding a media type in the print setting file.

FIG. 14 is a diagram illustrating information regarding duplex printing in the print setting file.

FIG. 15 is a diagram illustrating information regarding N-UP printing in the print setting file.

FIG. 16 is a diagram illustrating information regarding N-UP print page order in the print setting file.

FIG. 17 is a diagram illustrating information regarding a media size in the print setting file.

FIG. 18 is a diagram illustrating information regarding print quality in the print setting file.

FIG. 19 is a diagram illustrating information regarding an N-UP print output media size in the print setting file.

FIG. 20 is a diagram illustrating information regarding command control in the print setting file.

FIG. 21 is a diagram illustrating a construction of a print job.

FIG. 22 is a diagram illustrating specifications of control functions for controlling each print control command.

FIG. 27 is a diagram illustrating definitions of a name space, the number of copies, and the sheet feeding method of a print job schema.

FIG. 28 is a diagram illustrating a definition of a print orientation of the print job schema.

FIG. 29 is a diagram illustrating a definition of a color printing method of the print job schema.

FIG. 30 is a diagram illustrating a definition of resolution of the print job schema.

FIG. 31 is a diagram illustrating a definition of the media type of the print job schema.

FIG. 32 is a diagram illustrating a definition of a duplex printing method of the print job schema.

FIG. 33 is a diagram illustrating a definition of the number of N-UP print pages of the print job schema.

FIG. 34 is a diagram illustrating a definition of the N-UP print page order of the print job schema (part 1).

FIG. 35 is a diagram illustrating a definition of the N-UP print page order of the print job schema (part 2).

FIG. 36 is a diagram illustrating a definition of the media size of the print job schema.

FIG. 37 is a diagram illustrating a definition of the print quality of the print job schema.

FIG. 38 is a diagram illustrating a definition of the N-UP print output media size of the print job schema.

FIG. 39 is a diagram illustrating information regarding the sheet feeding method in the print setting file in an integrated print system.

FIG. 40 is a diagram illustrating information regarding the print orientation in the print setting file in the integrated print system.

FIG. 41 is a diagram illustrating information regarding the color printing method in the print setting file in the integrated print system.

FIG. 42 is a diagram illustrating information regarding the resolution in the print setting file in the integrated print system.

FIG. 43 is a diagram illustrating information regarding the media type in the print setting file in the integrated print system.

FIG. 44 is a diagram illustrating information regarding the duplex printing in the print setting file in the integrated print system.

FIG. 45 is a diagram illustrating information regarding the N-UP printing in the print setting file in the integrated print system.

FIG. 46 is a diagram illustrating information regarding the N-UP print page order in the print setting file in the integrated print system (part 1).

FIG. 47 is a diagram illustrating information regarding the N-UP print page order in the print setting file in the integrated print system (part 2).

FIG. 48 is a diagram illustrating information regarding the media size in the print setting file in the integrated print system.

FIG. 49 is a diagram illustrating information regarding the print quality in the print setting file in the integrated print system.

FIG. 50 is a diagram illustrating information regarding the N-UP print output media size in the print setting file in the integrated print system.

FIG. 51 is a diagram illustrating information regarding the command control in the print setting file in the integrated print system.

FIG. 52 is a diagram illustrating the specifications of the control functions for controlling each print control command in the integrated print system.

FIG. 54 is a diagram illustrating a part of the print job capability formed in step S5303 of the obtaining process of the print job capability in the integrated print system illustrated in FIG. 53.

FIG. 55 is a diagram illustrating a part of the print job capability formed in steps S5307 and S5308 of the obtaining process of the print job capability in the integrated print system illustrated in FIG. 53.

FIG. 56 is a diagram illustrating a part of the print job capability formed in step S5309 of the obtaining process of the print job capability in the integrated print system illustrated in FIG. 53.

FIG. 57 is a diagram illustrating a name space and a sheet feeding method of the print job capability of a printer 3 which can be obtained through the printer driver 50 in the integrated print system.

FIG. 58 is a diagram illustrating a print orientation of the print job capability of the printer 3 which can be obtained through the printer driver 50 in the integrated print system.

FIG. 59 is a diagram illustrating a color printing method of the print job capability of the printer 3 which can be obtained through the printer driver 50 in the integrated print system.

FIG. 60 is a diagram illustrating resolution of the print job capability of the printer 3 which can be obtained through the printer driver 50 in the integrated print system.

FIG. 61 is a diagram illustrating a media type of the print job capability of the printer 3 which can be obtained through the printer driver 50 in the integrated print system.

FIG. 62 is a diagram illustrating a duplex printing method of the print job capability of the printer 3 which can be obtained through the printer driver 50 in the integrated print system.

FIG. 63 is a diagram illustrating an N-UP printing of the print job capability of the printer 3 which can be obtained through the printer driver 50 in the integrated print system (part 1).

FIG. 64 is a diagram illustrating the N-UP printing of the print job capability of the printer 3 which can be obtained through the printer driver 50 in the integrated print system (part 2).

FIG. 65 is a diagram illustrating a media size of the print job capability of the printer 3 which can be obtained through the printer driver 50 in the integrated print system.

FIG. 66 is a diagram illustrating print quality of the print job capability of the printer 3 which can be obtained through the printer driver 50 in the integrated print system.

FIG. 67 is a diagram illustrating an N-UP print output media size of the print job capability of the printer 3 which can be obtained through the printer driver 50 in the integrated print system.

DESCRIPTION OF THE EMBODIMENTS

An embodiment of the invention will be described hereinbelow with reference to the drawings.

In the following description, "USB" is an abbreviation of "Universal Serial Bus". Since the USB is a well-known interface which can perform bidirectional communication, its detailed description is omitted. Since "XML" is an abbreviation of "eXtensible Markup Language" standardized in W3C, its detailed description is omitted.

Figure 1:
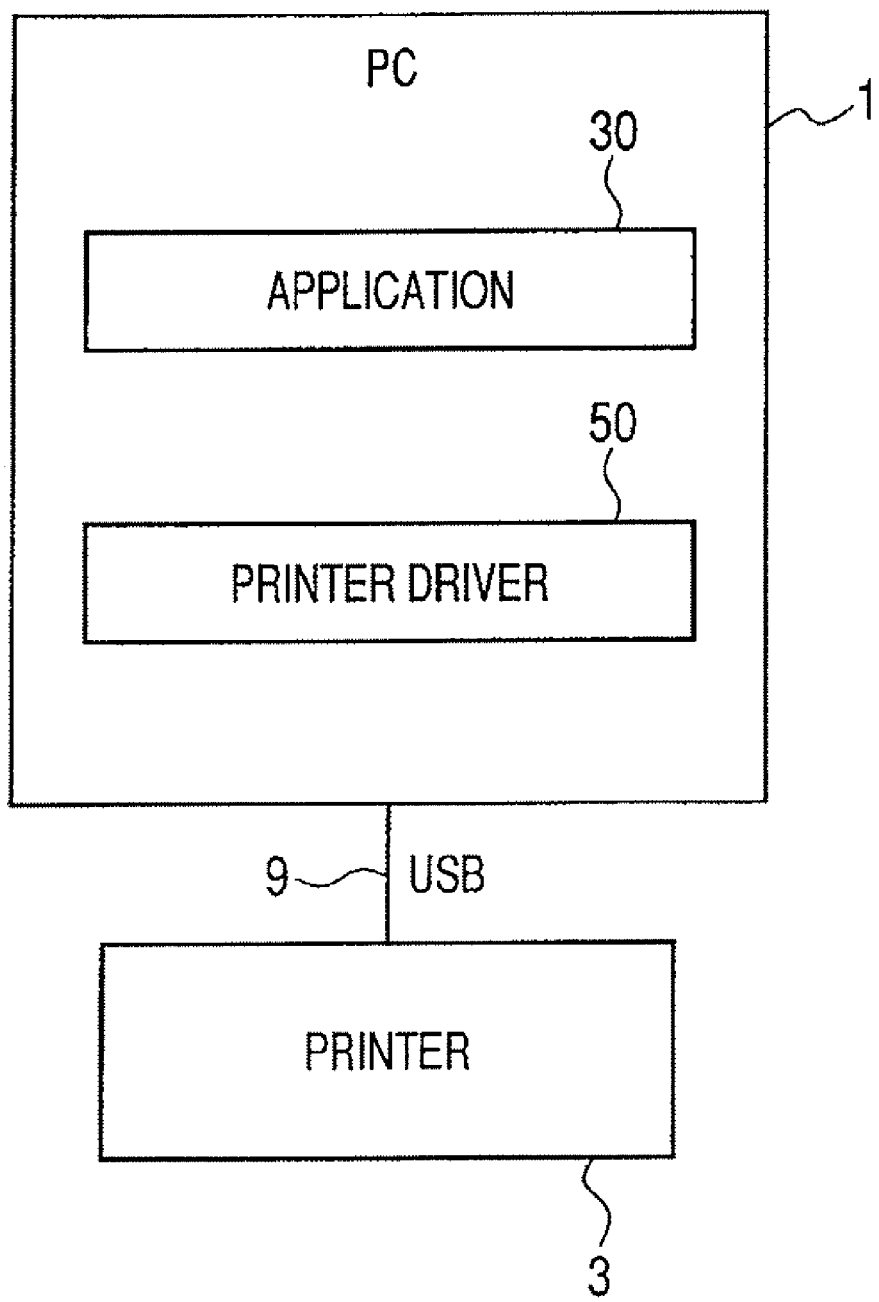
FIG. 1 is a block diagram illustrating a construction of a peripheral apparatus control system including an information processing apparatus and a peripheral apparatus according to an embodiment.
Figure 2:
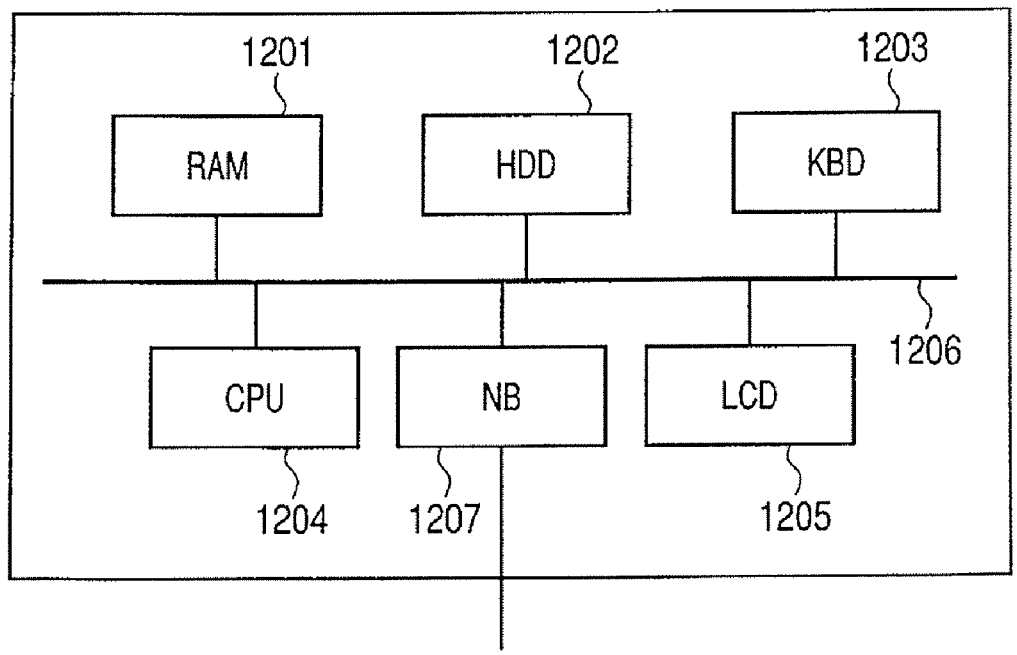
FIG. 2 is a block diagram illustrating an example of a hardware construction of a PC 1.

FIG. 1 is a block diagram illustrating a construction of a peripheral apparatus control system including an information processing apparatus and a peripheral apparatus according to the present embodiment. In FIG. 1, the information processing apparatus 1 is constructed using a general personal computer (hereinbelow, there is a case where it is abbreviated to "PC"). The PC 1 is constructed using hardware as illustrated in FIG. 2, which will be described hereinafter. A general OS such as Windows (registered trademark) XP or the like has been installed as an OS in the PC 1. In the embodiment, it is assumed that it is the OS made by ABE Co., Ltd.

Figure 3:
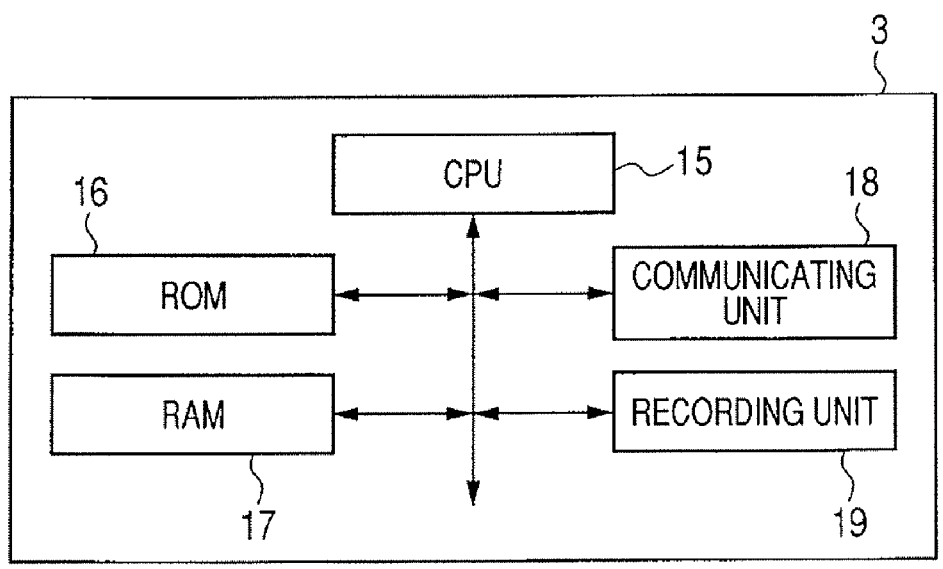
FIG. 3 is a block diagram illustrating a hardware construction of a printer 3.

A printer 3 is a color ink-jet printer and is shown as an example of a peripheral apparatus in the present embodiment. As peripheral apparatuses in the embodiment, a printer, a copying apparatus, a facsimile apparatus, a scanner, a digital camera, a hybrid apparatus having their composite functions, and the like can be mentioned. The printer 3 is constructed by hardware as illustrated in FIG. 3, which will be described hereinafter. The printer 3 is connected to the PC 1 through a USB interface 9 and can perform the bidirectional communication with each other.

Figure 4:
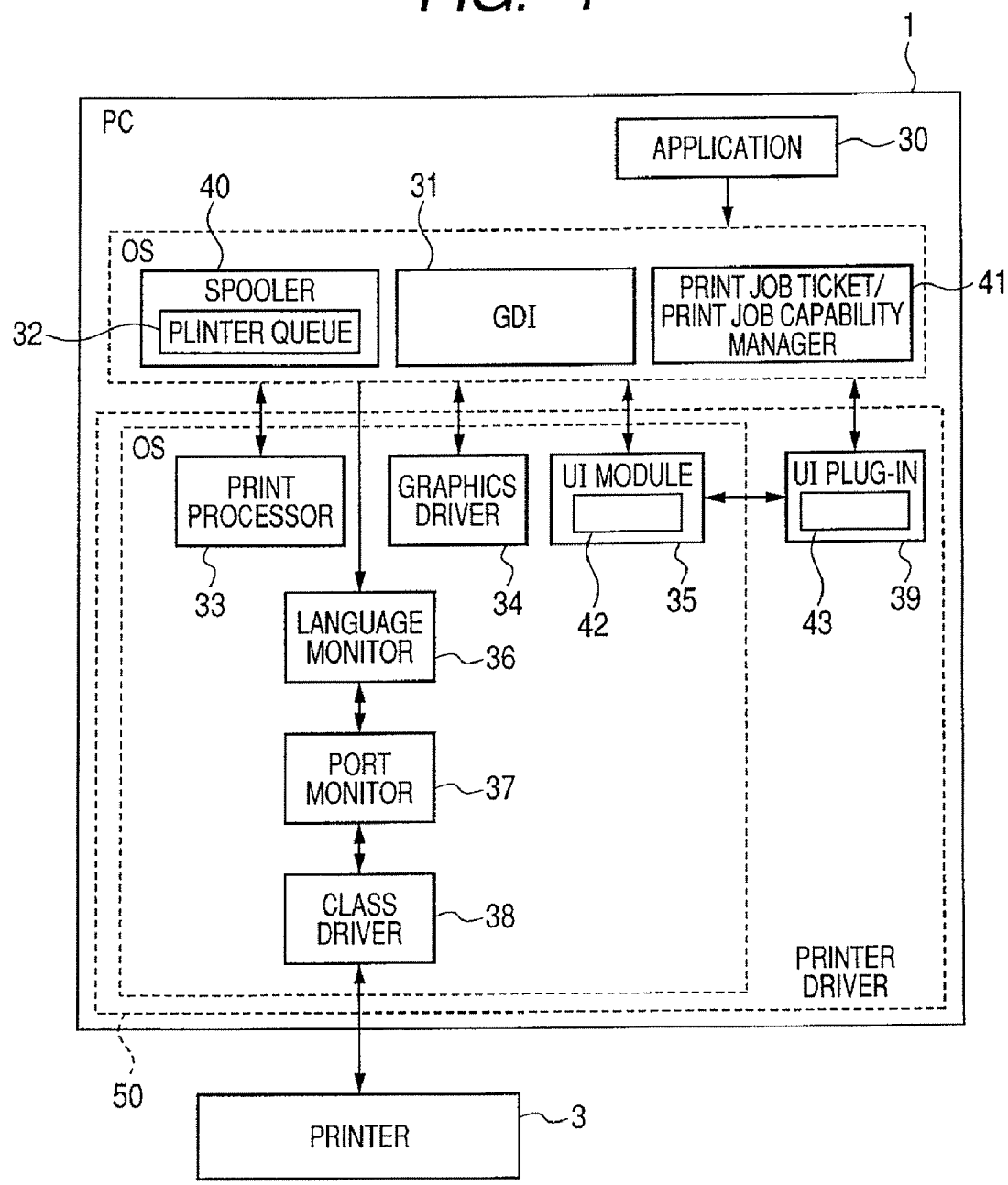
FIG. 4 is a diagram illustrating a construction of a printer driver in the PC 1.
Figure 5:
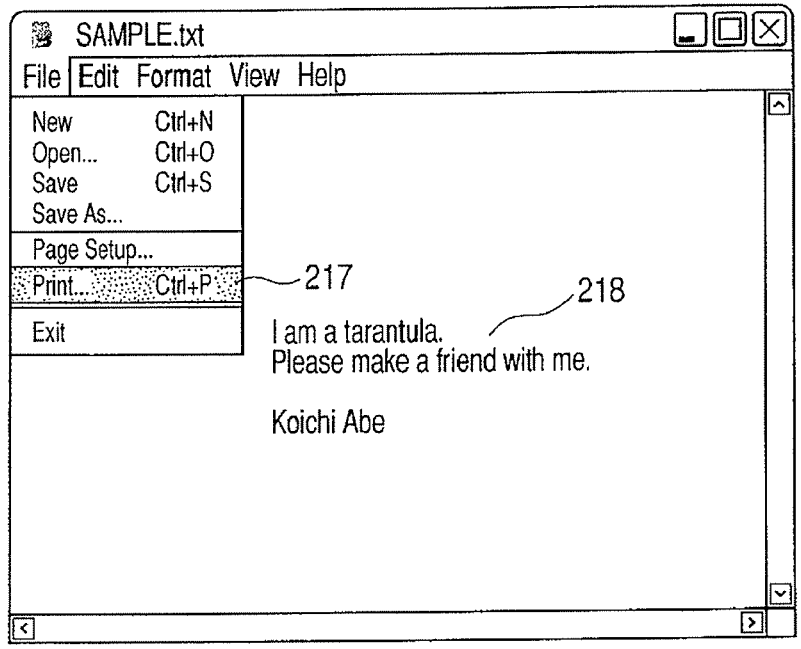
FIG. 5 is a diagram illustrating an example of the operation of the user at the time when printing is executed from a text editor having a printing function.

An application 30 is a file in an executable format. In the present embodiment, the application 30 is a text editor having a printing function as illustrated in FIG. 5, which will be described hereinafter. The PC 1 has a printer driver 50 as illustrated in FIG. 4, which will be described hereinafter.

FIG. 2 is a block diagram illustrating an example of a hardware construction of the PC 1. The PC 1 has the hardware construction as illustrated in FIG. 2. That is, as component elements, the PC 1 has a random access memory unit (RAM 1201), a hard disk drive unit (HDD 1202) as a storing unit, and a keyboard unit (KBD 1203) as an example of an input unit. As component elements, the PC 1 also has a CPU 1204 as a control unit, a display (LCD 1205) as an example of a display unit, a network board (NB 1207) as an example of a communication control unit, and a bus 1206 for connecting the above component elements of the PC 1.

The storing unit may be replaced with a portable CD-ROM, a built-in ROM, or the like. The modules (application 30, printer driver 50) of the PC 1 illustrated in FIG. 1 are stored into the HDD 1202, read out and stored into the RAM 1201 as necessary, and executed by the CPU 1204. Thus, the CPU 1204 realizes functions of the modules illustrated in FIG. 1.

FIG. 3 is a block diagram illustrating a hardware construction of the printer 3. The printer 3 has the hardware construction as illustrated in FIG. 3. In FIG. 3, a CPU 15 is constructed by a microprocessor or the like. As a central processing unit of the printer 3, the CPU 15 control a RAM 17, a communicating unit 18, and a recording unit 19 according to programs stored in a ROM 16. In FIG. 3, bidirectional arrows indicate address data buses.

Programs which are used for the printer 3 to execute a recording (printing) process and a process for transferring a state to the PC 1 according to the control of the printer driver 50 have been stored in the ROM 16. Print data, which is mainly sent from the PC 1 for printing by the recording unit 19, is temporarily stored in the RAM 17.

A connecting port for the USB interface 9 is included in the communicating unit 18. The communicating unit 18 controls the communication of the USB. The recording unit 19 is constructed by: a recording unit including a recording head of an ink-jet system, each color ink, a carriage, a recording paper conveying mechanism, and the like; and an electric circuit including an ASIC and the like for allowing the recording head to generate a printing pulse based on the print data.

By the printing operation on the printable application, the display contents (image data) of the file opened by the application is temporarily stored as a spool file of an EMF format into the HDD 1202 of the PC 1. After the image data was converted into print data including a command for controlling the printer 3 through the printer driver 50, the print data is sent to the printer 3 through the USB interface 9. The print data received by the printer 3 is converted into the printing pulse and printed onto a recording sheet by the recording unit 19.

FIG. 4 is a diagram illustrating a construction of the printer driver in the PC 1. The printer driver 50 has been installed in the PC 1. The printer driver 50 includes a plurality of modules 33 to 39. The printable application 30 is, for example, a text editor having the printing function as illustrated in FIG. 5, which will be described hereinafter.

A GDI (Graphics Device Interface) 31 is a part of the OS. A printer queue 32 is constructed as a part of a spooler 40. A print job is queued into the printer queue 32. The queued print job is displayed in a printer queue folder (its description is omitted here).

A print processor 33 executes a change in print layout and a special process of a print image. As a core of an image process of the printer driver, a graphics driver 34 executes the image process for printing based on a draw command sent from the GDI 31 and forms a print control command.

A UI module 35 provides and controls a user interface of the printer driver. A UI plug-in 39 is hooked from the UI module 35 and can customize the user interface of the printer driver and its control into those peculiar to the printer 3. As a communication I/F of data, a language monitor 36 controls transmission and reception of the data. A port monitor 37 executes a process for transmitting the data sent from the language monitor 36 to a proper port or receiving the data sent from the printer 3 through a class driver 38.

The class driver 38 is a module of a low level which is closest to the port. In the embodiment, the class driver 38 corresponds to a driver of a printer class of the USB and controls the port (USB port in the embodiment).

A print job ticket/print job capability manager 41 in the OS controls processes regarding a print job ticket expressed by a hierarchical structure of the XML format and a print job capability. An API for obtaining the print job capability which is called by the application 30 in order to obtain the print job capability from the printer driver 50 is provided by the print job ticket/print job capability manager 41.

A print job ticket/print job capability provider 42 in the UI module 35 controls the processes regarding the print job ticket expressed by the hierarchical structure of the XML format and the print job capability. A process of step S5303 in FIG. 53, which will be described hereinafter, is controlled by the print job ticket/print job capability provider 42.

A print job ticket/print job capability provider 43 in the UI plug-in 39 controls the processes regarding the print job ticket expressed by the hierarchical structure of the XML format and the print job capability. Processes of steps S5304 to S5310 in FIG. 53, which will be described hereinafter, are controlled by the print job ticket/print job capability provider 43.

Each of the print processor 33, graphics driver 34, UI module 35, language monitor 36, port monitor 37, and class driver 38 is a part of the OS.

FIG. 5 is a diagram illustrating an example of the operation of the user at the time when the printing is executed from the text editor having the printing function. In FIG. 5, when the user selects a print menu (Print . . . ) 217 from a File menu, the printing process of the display contents of the text displayed on a text display unit 218 is started in the PC 1 or the like.

Figure 6:
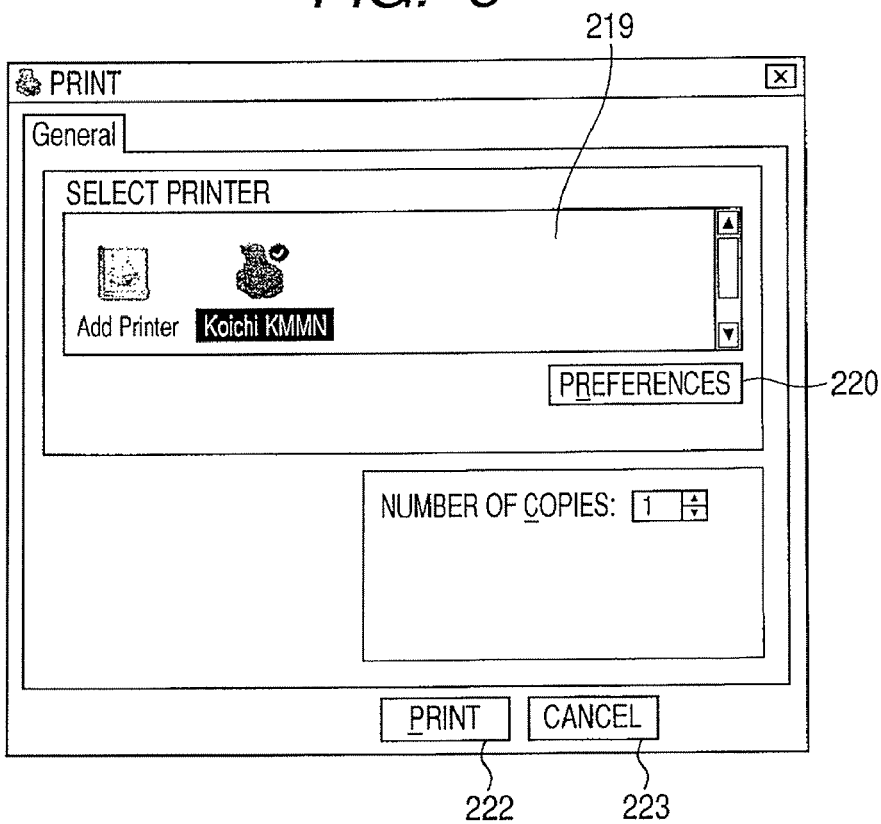
FIG. 6 is a diagram illustrating a Print dialog.

FIG. 6 is a diagram illustrating a Print dialog. When the print menu 217 is selected in FIG. 5, the PC 1 displays the dialog illustrated in FIG. 6. By using a printer selecting unit 219, the user can select the printer to execute the printing. FIG. 6 illustrates a state where the printer driver 50 which enables the printer 3 to execute the printing has been selected.

When the user clicks a Preferences button 220, the PC 1 opens a print setting dialog of the printer driver selected by the printer selecting unit 219 and makes detailed settings. When the user clicks a Print button 222, the PC 1 starts the printing according to each of the selected settings and closes the Print dialog illustrated in FIG. 6. When the user clicks a Cancel button 223, the PC 1 closes the Print dialog illustrated in FIG. 6 without starting the printing.

FIG. 7 is a diagram illustrating the print setting dialog of the printer driver 50. In FIG. 7, by using a print setting dialog 224, the user can select or designate each print setting for executing the printing by the printer 3 through the printer driver 50.

By using a sheet feeding method selecting unit 227, the user can select a proper sheet feeding method from "Automatic Sheet Feeder (ASF)" and "Cassette". FIG. 7 illustrates a state where "ASF" has been selected. By using a resolution selecting unit 228, the user can select proper resolution upon printing from "High" and "Standard". FIG. 7 illustrates a state where "Standard" has been selected.

By using a media size selecting unit 229, the user can select a proper media size from "Letter", "Legal", "A4", "B5", and "A4+". FIG. 7 illustrates a state where "A4" has been selected. By using a media type selecting unit 230, the user can select a proper media type from "Plain", "Photo", and "ProPhoto". FIG. 7 illustrates a state where "Plain" has been selected.

By using a duplex print selecting unit 231, the user can select a proper duplex printing method from "OneSided", "TwoSidedLongEdge", and "TwoSidedShortEdge". FIG. 7 illustrates a state where "OneSided" has been selected. The "OneSided" denotes a normal printing method whereby the print data is printed only to one side without performing the duplex printing. By using a print quality selecting unit 232, the user can select proper print quality from "Automatic", "High", and "Normal". FIG. 7 illustrates a state where "Automatic" has been selected.

By using a color selecting unit 233, the user can select either "Color (color printing)" or "Monochrome (monochromatic printing)" FIG. 7 illustrates a state where "Color" has been selected. By using a copy number designating unit 234, the user can designate the number of print copies by an arbitrary integer within a range from 1 to 255. FIG. 7 illustrates a state where "1 (one copy)" has been selected.

By using a print orientation selecting unit 235, the user can select a proper print orientation from "Portrait" and "Landscape". FIG. 7 illustrates a state where "Portrait" has been selected.

An N-UP print selecting unit 236 is constructed by an N-UP print page number selecting unit 237, an N-UP print page order selecting unit 238, and an N-UP print output media size selecting unit 239. The user makes the setting regarding the N-UP printing by using the N-UP print selecting unit 236.

By using the N-UP print page number selecting unit 237, the user can select the number of pages to be arranged into one page upon N-UP printing from "1", "2", "4", and "6" pages. FIG. 7 illustrates a state where "1" page has been selected. When "1" page is selected, the normal printing of one page is executed instead of the N-UP printing. By using the N-UP print page order selecting unit 238, the user can select the proper order of pages to be arranged into one page upon N-UP printing from the following sequences.

"Left Top→Right Bottom (horizontal) (RightBottom)", "Top Left→Bottom Right (vertical) (BottomRight)", "Right Top→Left Bottom (horizontal) (LeftBottom)", "Top Right→Bottom Left (vertical) (BottomLeft)", "Left Bottom→Right Top (horizontal) (RightTop)", "Bottom Left→Top Right (vertical) (TopRight)", "Right Bottom→Left Top (horizontal) (LeftTop)", "Bottom Right→Top Left (vertical) (TopLeft)", "Left Top→Right Bottom (horizontal) or Top Left→Bottom Right (vertical) (RightOrBottom)", and "Right Bottom→Left Top (horizontal) or Bottom Right→Top Left (vertical) (LeftOrTop)".

FIG. 7 illustrates a state where "RightBottom" page has been selected. By using the N-UP print output media size selecting unit 239, the user can select a desired output media size upon N-UP printing from "Letter", "Legal", "A4", "B5", and "A4+". FIG. 7 illustrates a state where "A4" has been selected.

When an OK button 225 is clicked, the PC 1 stores (sets) the selected or designated print settings and closes the print setting dialog 224. When a Cancel button 226 is clicked, the PC 1 abandons the selected or designated print settings and closes the print setting dialog 224.

The print setting dialog of FIG. 7 is a dialog specified to the printer driver 50 for controlling the printer 3. Another printer cannot be controlled by using this print setting dialog.

FIG. 8 illustrates a print control structure. In FIG. 8, PRINT_MODE is a definition showing the print control structure and is constructed by the following members of a single hierarchic structure.

"member": "contents": "print setting"

InputBin: designation of the sheet feeding method: the sheet feeding method selecting unit Orientation: designation of the print orientation: the print orientation selecting unit Color: designation of the color printing: the color selecting unit Resolution: designation of the resolution: the resolution selecting unit MediaType: designation of the media type: the media type selecting unit Duplex: designation of the duplex printing: the duplex print selecting unit NUp: designation of the N-UP printing: the N-UP print page number selecting unit PresentationDirection: designation of the N-UP print page order: the N-UP print page order selecting unit MediaSize: designation of the media size: the media size selecting unit OutputQuality: designation of the print quality: the print quality selecting unit OutputMediaSize: designation of the N-UP print output media size: the N-UP print output media size selecting unit CopyCount: designation of the number of copies: the copy number designating unit In this OS, the print settings which are handled between the application 30 and the printer driver 50 are expressed by a form of the print control structure. The application 30 uses a pointer of the print control structure as an argument and transfers the print settings to the printer driver 50 through an Application Program Interface (hereinbelow, there is a case where it is abbreviated to "API"), or the application 30 obtains the print settings from the printer driver 50 through the API. Each of the members other than CopyCount is defined by a pointer of long. If there is a plurality of values which are substituted for those members or if there is a plurality of values for which the members are substituted, those values are set into the relevant members in a form of layout. Zero (0) indicative of the end of the layout is set to the last layout.

FIGS. 9 to 20 are diagrams illustrating the contents of the print setting file. The print setting file is one of constructing files of the UI plug-in 39. Information regarding the settable print settings held in the printer driver 50 has been described in the print setting file. The print setting file is a file of a text format. Information regarding the print settings has been described in the print setting file by an expression of a non-hierarchical structure. This print setting file is first operation instructing information. The reason why the print setting file is expressed by the non-hierarchical structure is that the print setting file is used to form a print control structure constructed by the members of the single hierarchic structure and it has been designed by a minimum architecture necessary to form the print control structure. In FIGS. 9 to 19, each function of the print settings has been defined in Feature and options (selection items) which can be set by each function have been defined in Option. Initial values (default values) which are set (selected) by each function have been defined in Default.

FIG. 9 is a diagram illustrating the information regarding the sheet feeding method in the print setting file. In FIG. 9, the sheet feeding method is defined as follows.
  ID: 7 Automatic Sheet Feeder (ASF)
  ID: 267 Cassette (Cassette)
"7" and "267" designated by the IDs in FIG. 9 are set into InputBin of the print control structure (PRINT_MODE). The default value is "ASF".

FIG. 10 is a diagram illustrating the information regarding the print orientation in the print setting file. In FIG. 10, the print orientation is defined as follows.
  ID: 21 Portrait (Portrait)
  ID: 22 Landscape (Landscape)
"21" and "22" designated by the IDs in FIG. 10 are set into Orientation of the print control structure (PRINT_MODE). The default value is "Portrait".

FIG. 11 is a diagram illustrating the information regarding the color printing method in the print setting file. In FIG. 11, the color printing method is defined as follows.
  ID: 31 Color printing (Color)
  ID: 33 Monochromatic printing (Monochrome)
"31" and "33" designated by the IDs in FIG. 11 are set into Color of the print control structure (PRINT_MODE). The default value is "Color".

FIG. 12 is a diagram illustrating the information regarding the resolution in the print setting file. In FIG. 12, the resolution is defined as follows.
  ID: −4 High (High)
  DPI: (600, 600) 600×600 [dpi]
  ID: −3 Middle (Standard)
  DPI: (300, 300) 300×300 [dpi]
"−4" and "−3" designated by the IDs in FIG. 12 are set into Resolution of the print control structure (PRINT_MODE). The default value is "Standard".

FIG. 13 is a diagram illustrating the information regarding the media type in the print setting file. In FIG. 13, the media type is defined as follows.
  ID: 1 Plain paper (Plain)
  ID: 2 Photograph paper (Photo)
  ID: 285 Pro photograph paper (ProPhoto)
"1", "2", and "285" designated by the IDs in FIG. 13 are set into MediaType of the print control structure (PRINT_MODE). The default value is "Plain".

FIG. 14 is a diagram illustrating the information regarding duplex printing in the print setting file. In FIG. 14, the duplex printing is defined as follows.
  ID: 51 Simplex printing (OneSided)
  ID: 52 Duplex printing of the long edge (TwoSidedLongEdge)
  ID: 53 Duplex printing of the short edge (TwoSidedShortEdge)
"51", "52", and "53" designated by the IDs in FIG. 14 are set into Duplex of the print control structure (PRINT_MODE). The default value is "OneSided".

FIG. 15 is a diagram illustrating the information regarding N-UP printing in the print setting file. In FIG. 15, the N-UP printing is defined as follows.
  ID: 11 1 page (PagesPerSheet1)
  ID: 12 2 pages (PagesPerSheet2)
  ID: 14 4 pages (PagesPerSheet4)
  ID: 16 6 pages (PagesPerSheet6)
"11", "12", "14", and "16" designated by the IDs in FIG. 15 are set into NUp of the print control structure (PRINT_MODE). The default value is "PagesPerSheet1".

FIG. 16 is a diagram illustrating the information regarding N-UP print page order in the print setting file. In FIG. 16, the N-UP print page order is defined as follows.
  ID: 111 Left Top→Right Bottom (horizontal) (RightBottom)
  ID: 112 Top Left→Bottom Right (vertical) (BottomRight)
  ID: 113 Right Top→Left Bottom (horizontal) (LeftBottom)
  ID: 114 Top Right→Bottom Left (vertical) (BottomLeft)
  ID: 115 Left Bottom→Right Top (horizontal) (RightTop)
  ID: 116 Bottom Left→Top Right (vertical) (TopRight)
  ID: 117 Right Bottom→Left Top (horizontal) (LeftTop)
  ID: 118 Bottom Right→Top Left (vertical) (TopLeft)
  ID: 311 Left Top→Right Bottom (horizontal) or Top Left→Bottom Right (vertical) (RightOrBottom)
  ID: 312 Right Bottom→Left Top (horizontal) or Bottom Right→Top Left (vertical) (LeftOrTop)
"111", "112", "113", "114", "115", "116", "117", "118", "311", and "312" designated by the IDs in FIG. 16 are set into PresentationDirection of the print control structure (PRINT_MODE). The default value is "RightBottom".

FIG. 17 is a diagram illustrating the information regarding the media size in the print setting file. In FIG. 17, the media size is defined as follows.
  ID: 61 Letter
  ID: 62 Legal
  ID: 63 A4
  ID: 64 B5
  ID: 281 A4+ (A4Plus)
"61", "62", "63", "64", and "281" designated by the IDs in FIG. 17 are set into MediaSize of the print control structure (PRINT_MODE). The default value is "A4".

FIG. 18 is a diagram illustrating the information regarding print quality in the print setting file. In FIG. 18, the print quality is defined as follows.
  ID: 71 Auto (Automatic)
  ID: 72 Fine (High)
  ID: 73 Standard (Normal)
"71", "72", and "73" designated by the IDs in FIG. 18 are set into OutputQuality of the print control structure (PRINT_MODE). The default value is "Automatic".

FIG. 19 is a diagram illustrating the information regarding the N-UP print output media size in the print setting file. In FIG. 19, the N-UP print output media size is defined as follows.

ID: 61 Letter
ID: 62 Legal
ID: 63 A4
ID: 64 B5
ID: 281 A4+ (A4Plus)

"61", "62", "63", "64", and "281" designated by the IDs in FIG. 19 are set into OutputMediaSize of the print control structure (PRINT_MODE). The default value is "A4".

FIG. 20 is a diagram illustrating the information regarding the command control in the print setting file. In FIG. 20, a control method of each print control command for controlling the printer 3 is defined in Command. In each print control command, control order is defined in Order and a name of a control function is defined in CallID.

CmdStartJob is a control method of the control command at the start of the print job. The control order is JOB_SETUP.1 and the name of the control function is CMD_ID_START-JOB. CmdStartDoc is a control method of the control command at the start of a document included in the print job. The control order is DOC_SETUP.1 and the name of the control function is CMD_ID_STARTDOC.

CmdStartPage is a control method of the control command at the start of a page included in the document. The control order is PAGE_SETUP.1 and the name of the control function is CMD_ID_STARTPAGE. CmdEndPage is a control method of the control command at the end of the page included in the document. The control order is PAGE_FINISH.1 and the name of the control function is CMD_ID_ENDPAGE.

CmdEndDoc is a control method of the control command at the end of the document included in the print job. The control order is DOC_FINISH.1 and the name of the control function is CMD_ID_ENDDOC. CmdEndJob is a control method of the control command at the end of the print job. The control order is JOB_FINISH.1 and the name of the control function is CMD_ID_ENDJOB.

CmdGetPrnProperties is a control method of the control command at the time when the printer driver 50 returns the print setting information to the application 30. The control order is ANY and the name of the control function is CMD_ID_GETPRNPROPERTIES.

FIG. 21 is a diagram illustrating a construction of the print job. In FIG. 21, "JOB" denotes one print job and is constructed by N documents of Document 1, Document 2, . . . , and Document N. Document 1 has X pages of Page 1, Page 2, . . . , and Page X. Document 2 has Y pages of Page 1, Page 2, . . . , and Page Y. Document N has Z pages of Page 1, Page 2, . . . , and Page Z. In this manner, each document is constructed by a plurality of pages (there is also a case where it is constructed by one page).

FIG. 22 is a diagram illustrating specifications of the control functions for controlling each print control command. Each control function illustrated in FIG. 20 has such specifications that processes as illustrated in FIG. 22 are executed and their processing results are returned. Those control functions have been installed in the UI plug-in 39. The control functions illustrated in FIG. 20 are as follows.

CMD_ID_STARTJOB, CMD_ID_STARTDOC, CMD_ID_STARTPAGE, CMD_ID_ENDPAGE, CMD_ID_ENDDOC, CMD_ID_ENDJOB, and CMD_ID_GETPRNPROPERTIES.

Figure 23:
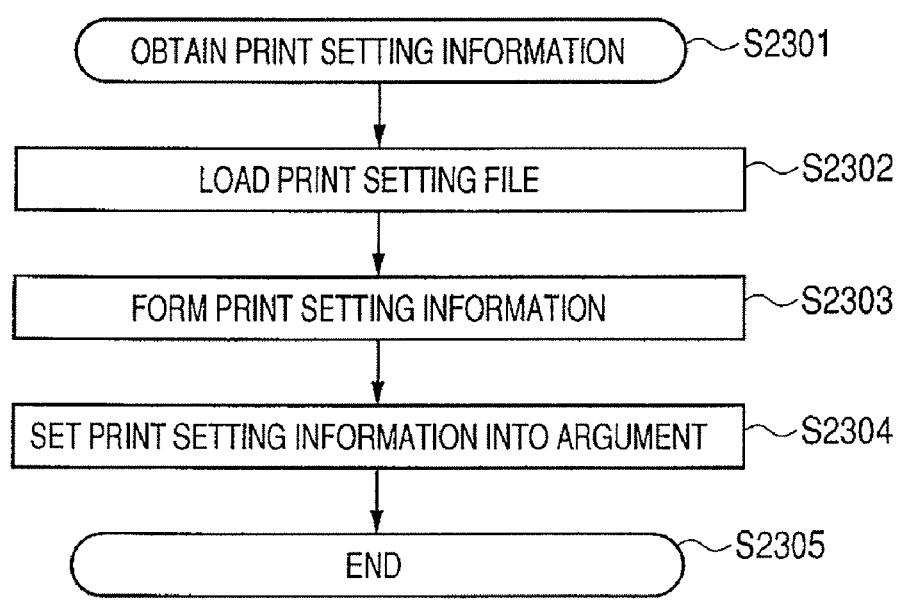
FIG. 23 is a flowchart showing an obtaining process of print setting information.

FIG. 23 is a flowchart showing an obtaining process of the print setting information. The application 30 calls a print setting API for obtaining the print settings from the printer driver 50. Thus, the UI module 35 is loaded into the OS. The obtaining process of the print setting information illustrated in FIG. 22 is started in the UI module 35 (S2301).

The UI module 35 loads the print setting files illustrated in FIGS. 9 to 20 (S2302) and forms the print setting information from the print setting files (S2303). In step S2303, the UI module 35 calls CMD_ID_GETPRNPROPERTIES from the print setting files according to the description of CmdGetPrnProperties illustrated in FIG. 20 and hooks the UI plug-in 39. The UI plug-in 39 customizes the print settings which are not described in the print setting files into the print settings peculiar to the printer 3. Since the customizing process is not concerned with the embodiment, its detailed description is omitted here.

The UI module 35 sets the formed print setting information into the print control structure (PRINT_MODE) illustrated in FIG. 8 as an argument of CMD_ID_GETPRNPROPERTIES (S2304) and finishes the obtaining process of the print setting information (S2305).

Figure 24:
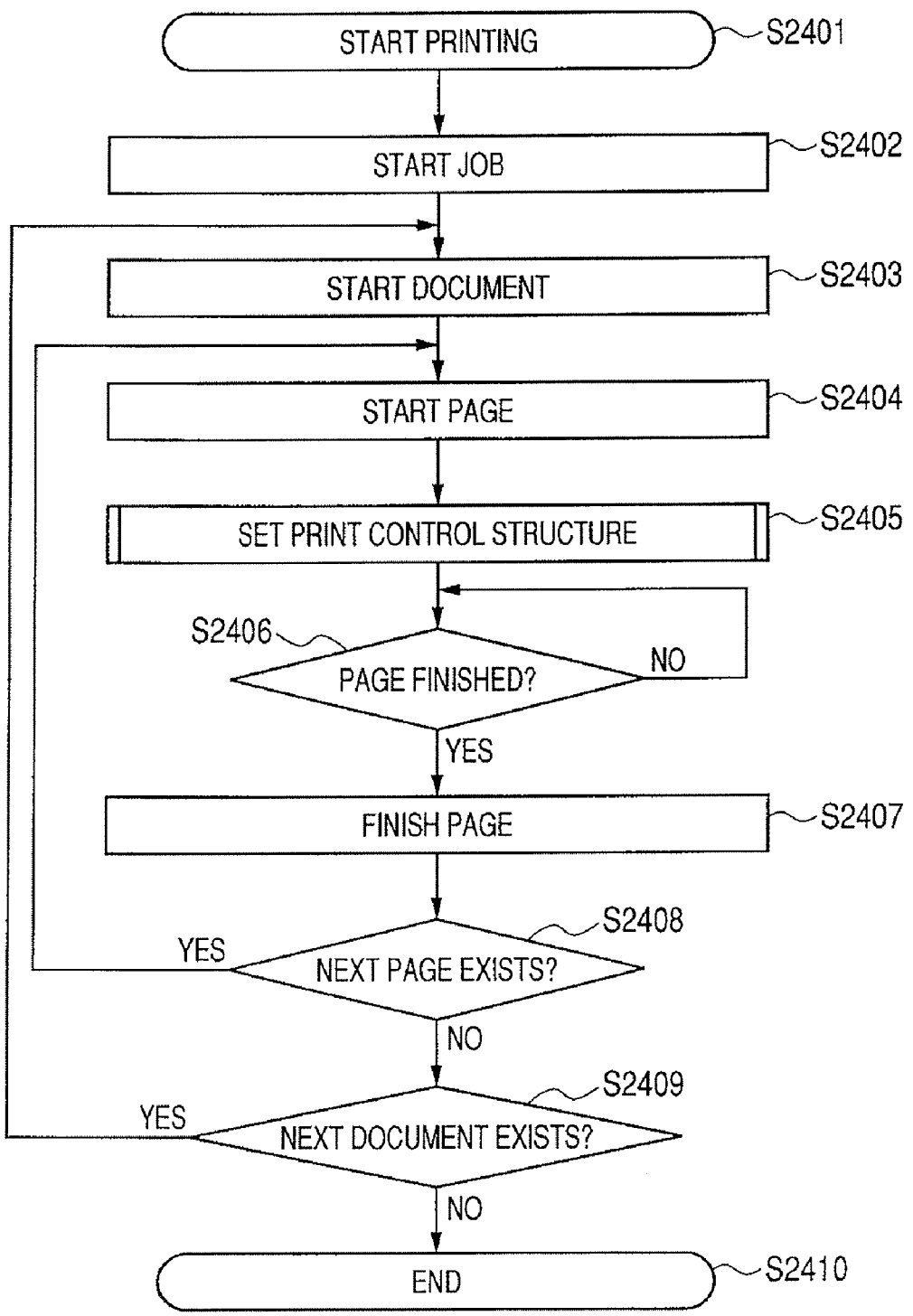
FIG. 24 is a flowchart showing a printing process.

FIG. 24 is a flowchart showing a printing process. When the application 30 starts the printing, the printer driver 50 is loaded into the OS and the printing process of FIG. 24 is started (S2401). When the printing process is started, the printer driver 50 calls the control function CMD_ID_STARTJOB. Thus, the process for starting the print job is executed (S2402). The printer driver 50 calls the control function CMD_ID_STARTDOC. Thus, the process for starting the document in the job is executed (S2403).

The printer driver 50 calls the control function CMD_ID_STARTPAGE. Thus, the process for starting the page in the document is executed (S2404). When the starting process of the page is executed, the printer driver 50 executes a process for making the setting of the print control structure illustrated in FIG. 25, which will be described hereinafter (S2405). When the page during the printing process is finished (YES in S2406), the printer driver 50 calls the control function CMD_ID_ENDPAGE. Thus, the process for finishing the page is executed (S2407).

After step S2407, the printer driver 50 discriminates the presence or absence of the next page (S2408). If the next page exists (YES in S2408), the printer driver 50 returns the processing routine to step S2404. If the next page does not exist (NO in S2408), the printer driver 50 discriminates the presence or absence of the next document in which such a page is included (S2409).

If the next document exists (YES in S2409), the printer driver 50 returns the processing routine to step S2403. If the next page does not exist, the printer driver 50 finishes the printing process (S2410).

Figure 25:
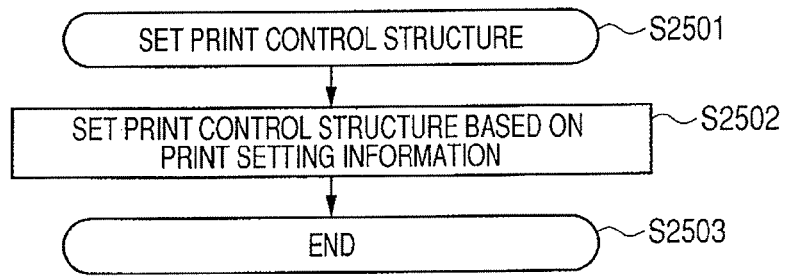
FIG. 25 is a flowchart showing a process for making setting of the print control structure.

FIG. 25 is a flowchart showing a process for making the setting of the print control structure. In FIG. 25, when the process for making the setting of the print control structure is started (S2501), the printer driver 50 executes the following processes. That is, the printer driver 50 sets the print control structure (PRINT_MODE) based on the print setting information selected or designated by the print setting dialog 224 (S2502) and finishes the process for making the setting of the print control structure (S2503).

The foregoing print system uses: the print setting file of the text format in which the information regarding the print settings has been described by the expression of the non-hierarchical structure; and the print control structure (PRINT_MODE) constructed by the members of the single hierarchic structure. There is a case where such a print system is abbreviated as a "conventional print system" hereinbelow. A print system using the print job ticket of the XML format in which the information regarding the print settings has been described by the expression of the hierarchical structure (hereinbelow, such a print system is abbreviated as a "new print system" exists. An integrated print system in which the architecture of the conventional print system is used as a base and a new print system is constructed thereon is considered. The integrated print system will be described hereinbelow.

Figure 26:
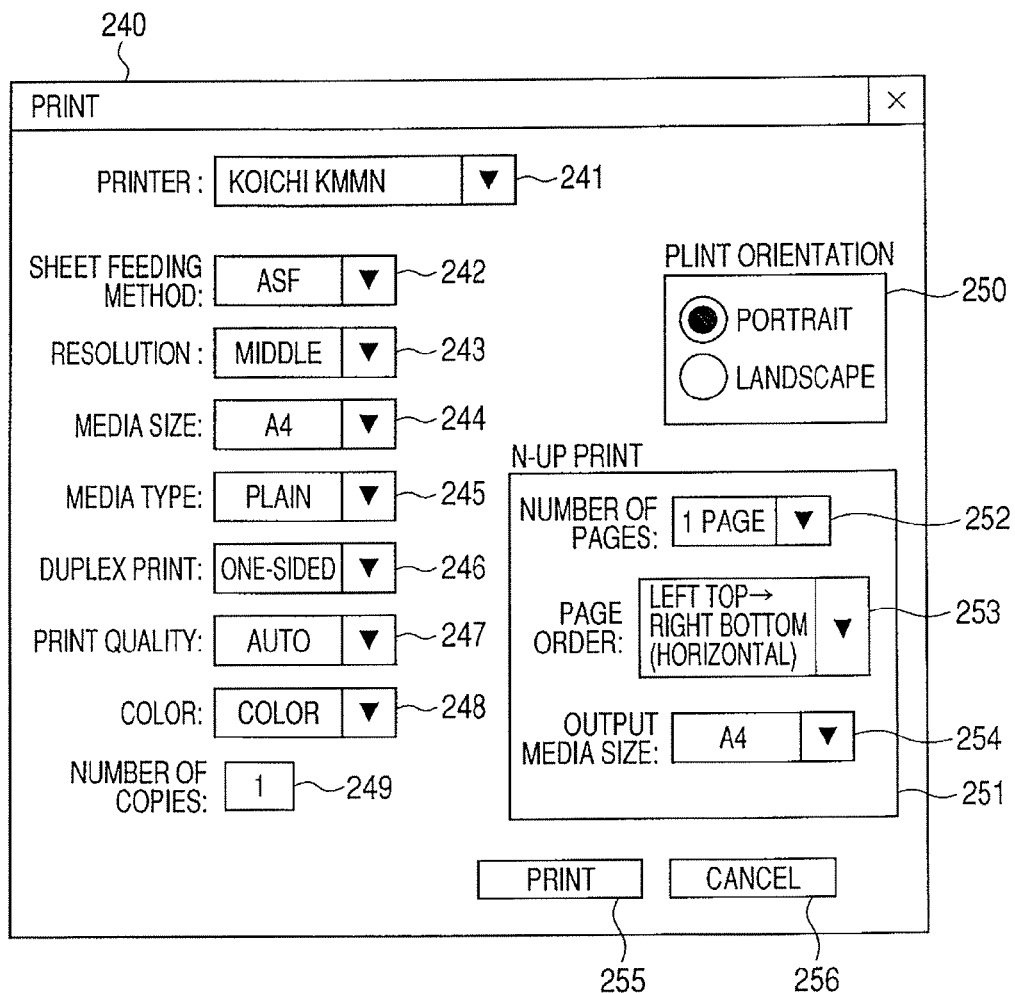
FIG. 26 is a diagram illustrating a Print dialog for an OS in which a new print system has been installed.

FIG. 26 is a diagram illustrating a Print dialog for an OS in which the new print system has been installed. When the print menu 217 is selected by the text editor having the printing function illustrated in FIG. 5 on the OS in which the new print system has been installed, a Print dialog 240 is displayed. Through the Print dialog 240, each print setting can be selected or designated for an arbitrary printer or printer driver corresponding to the new print system which supports the print job ticket or print job capability, which will be described hereinafter.

In FIG. 26, by using a printer selecting unit 241, the user can select the printer for executing the printing. FIG. 26 illustrates a state where the printer driver 50 which enables the printer 3 to print has been selected. A description will be made hereinbelow within a range of a public schema of ABE Co., Ltd. defined by ABE Co., Ltd. as a manufacturing source of the OS. However, the selection item which can be selected by each print setting is not limited to such a range of the public schema but the user can also select the selection item defined by a private schema defined by a manufacturing source of the printer.

By using a sheet feeding method selecting unit 242, the user can select a proper sheet feeding method from "Automatic Sheet Feeder (ASF)", "Cassette", and "Manual". FIG. 26 illustrates a state where "ASF" has been selected. By using a resolution selecting unit 243, the user can select a proper resolution upon printing from "High", "Middle", and "Low". FIG. 26 illustrates a state where "Middle" has been selected.

By using a media size selecting unit 244, the user can select a proper media size from "Letter", "Legal", "A5", "A4", "B5", and "Photo (8×10 inches)". FIG. 26 illustrates a state where "A4" has been selected. By using a media type selecting unit 245, the user can select a proper media type from "Plain" and "Photo". FIG. 26 illustrates a state where "Plain" has been selected.

By using a duplex print selecting unit 246, the user can select a duplex printing method from "OneSided", "TwoSidedLongEdge", and "TwoSidedShortEdge". FIG. 26 illustrates a state where "OneSided" has been selected. The "OneSided" denotes the normal printing method whereby the print data is printed only to one side without performing the duplex printing. By using a print quality selecting unit 247, the user can select proper print quality from "Automatic", "High (fine)", "Normal", and "Draft". FIG. 26 illustrates a state where "Automatic" has been selected.

By using a color selecting unit 248, the user can select a proper color printing method from "Color", "GrayScale", and "Monochrome" FIG. 26 illustrates a state where "Color" has been selected. By using a copy number designating unit 249, the user can designate the number of print copies by an arbitrary integer within a range from 1 to 255. FIG. 26 illustrates a state where "1 (one copy)" has been selected.

By using a print orientation selecting unit 250, the user can select a proper print orientation from "portrait" and "landscape". FIG. 26 illustrates a state where "portrait" has been selected. An N-UP print selecting unit 251 is constructed by an N-UP print page number selecting unit 252, an N-UP print page order selecting unit 253, and an N-UP print output media size selecting unit 254. The user makes the setting regarding the N-UP printing by using the N-UP print selecting unit 251.

By using the N-UP print page number selecting unit 252, the user can select the number of pages to be arranged into one page upon N-UP printing from "1", "2", "4", "6", "9", and "16" pages. FIG. 26 illustrates a state where "1" page has been selected. When "1" page is selected, the normal printing of one page is executed instead of the N-UP printing. By using the N-UP print page order selecting unit 253, the user can select the proper order of pages to be arranged into one page upon N-UP printing from the following sequences.

"Left Top→Right Bottom (horizontal) (RightBottom)", "Top Left→Bottom Right (vertical) (BottomRight)", "Right Top→Left Bottom (horizontal) (LeftBottom)", "Top Right→Bottom Left (vertical) (BottomLeft)", "Left Bottom→Right Top (horizontal) (RightTop)", "Bottom Left→Top Right (vertical) (TopRight)", "Right Bottom→Left Top (horizontal) (LeftTop)", and "Bottom Right→Top Left (vertical) (TopLeft)".

FIG. 26 illustrates a state where "RightBottom" page has been selected. By using the N-UP print output media size selecting unit 254, the user can select a desired output media size upon N-UP printing from "Letter", "Legal", "A5", "A4", "B5", and "Photo (8×10 inches)". FIG. 26 illustrates a state where "A4" has been selected.

When the user clicks a Print button 255, the PC 1 starts the printing according to the selected print settings and closes the Print dialog. When the user clicks a Cancel button 256, the PC 1 closes the Print dialog without starting the printing.

As mentioned above, the selection item defined by the private schema defined by the manufacturing source of the printer can be also selected. For example, "A4+" can be also selected by the media size selecting unit 244 or the N-UP print output media size selecting unit 254. "Prophoto" can be also selected by the media type selecting unit 245. "RightOrBottom" or "LeftOrTop" can be also selected by the N-UP print page order selecting unit 253.

FIGS. 27 to 38 are diagrams illustrating the definitions of print job schemas. The print job tickets which are used in the new print system are specified by the schema defined by the print job schemas illustrated in those diagrams. In those diagrams, in the embodiment, portions related to the embodiment will be described and description of a format and the like of the general schema is omitted. In the diagrams, pjsf denotes a print job schema framework (Print Job Schema Framework). As shown by xmlns:pjsf="http://schemas.abe.com/printjobshcemaframework" on the third line in FIG. 27, a name space has been set as a public schema of ABE Co., Ltd. Therefore, the definition in which pjsf is described is handled as a public schema of ABE Co., Ltd.

pjsk denotes a print job schema keyword (Print Job Schema Keyword). As shown by xmlns:pjsk="http://schemas.abe.com/printjobshcemakeywords" on the sixth line in FIG. 27, a name space has been set as a public schema of ABE Co., Ltd. Therefore, the definition in which pjsk is described is handled as a public schema of ABE Co., Ltd.

ParameterInit denotes a schema showing a variable. Feature denotes a schema showing a function of each print setting. Property denotes a schema showing characteristics. For example, a character string which is set to String designated by DisplayName shows a character string which can be used for display. Option denotes a schema showing options (selection items) of each function. One of the following definitions is substituted into "Range" according to a print setting situation.

PrintJob: Print setting which is set on a job unit basis
PrintDocument: Print setting which is set on a document unit basis
PrintPage: Print setting which is set on a page unit basis FIG. 27 is a diagram illustrating definitions of a name space, the number of copies, and the sheet feeding method of the print job schema. In FIG. 27, a name space of the print job schema is defined in the third to sixth lines. CopyCount denotes a definition of the number of print copies which can be designated by the copy number designating unit 249. The function: InputBin denotes a definition of the sheet feeding method which can be selected by the sheet feeding method selecting unit 242. The option: ASF denotes a definition of the selection item of "Automatic Sheet Feeder (ASF)". The option: Cassette denotes a definition of the selection item of "Cassette". The option: Manual denotes a definition of the selection item of "Manual".

FIG. 28 is a diagram illustrating a definition of a print orientation of the print job schema. In FIG. 28, the function: Orientation denotes a definition of the print orientation which can be selected by the print orientation selecting unit 250. The option: Portrait denotes a definition of the selection item of "Portrait". The option: Landscape denotes a definition of the selection item of "Landscape".

FIG. 29 is a diagram illustrating a definition of a color printing method of the print job schema. In FIG. 29, the function: OutputColor denotes a definition of the color printing method which can be selected by the color selecting unit 248. The option: Color denotes a definition of the selection item of "Color". The option: GrayScale denotes a definition of the selection item of "GrayScale". The option: Monochrome denotes a definition of the selection item of "Monochrome".

FIG. 30 is a diagram illustrating a definition of resolution of the print job schema. In FIG. 30, the function: Resolution denotes a definition of the resolution which can be selected by the resolution selecting unit 243. The option: High denotes a definition of the selection item of "High". The option: Standard denotes a definition of the selection item of "Standard". The option: Draft denotes a definition of the selection item of "Draft".

FIG. 31 is a diagram illustrating a definition of the media type of the print job schema. In FIG. 31, the function: MediaType denotes a definition of the media type which can be selected by the media type selecting unit 245. The option: Plain denotes a definition of the selection item of "Plain". The option: Photo denotes a definition of the selection item of "Photo".

FIG. 32 is a diagram illustrating a definition of the duplex printing method of the print job schema. In FIG. 32, the function: Duplex denotes a definition of the duplex printing method which can be selected by the duplex print selecting unit 246. The option: OneSided denotes a definition of the selection item of "OneSided". The option: TwoSidedLongEdge denotes a definition of the selection item of "TwoSidedLongEdge". The option: TwoSidedShortEdge denotes a definition of the selection item of "TwoSidedShortEdge".

FIGS. 33 to 35 are diagrams illustrating definitions of the N-UP printing of the print job schema. In the diagrams, the function: NUp denotes a definition of the N-UP which can be selected by the N-UP print selecting unit 251.

FIG. 33 is a diagram illustrating a definition of the number of N-UP print pages of the print job schema. In FIG. 33, each option denotes a definition of the number of N-UP print pages which can be selected by the N-UP print page number selecting unit 252. The option: PagesPerSheet1 denotes a definition of the selection item of "1". The option: PagesPerSheet2 denotes a definition of the selection item of "2". The option: PagesPerSheet4 denotes a definition of the selection item of "4". The option: PagesPerSheet6 denotes a definition of the selection item of "6". The option: PagesPerSheet9 denotes a definition of the selection item of "9". The option: PagesPerSheet16 denotes a definition of the selection item of "16".

FIG. 34 is a diagram illustrating a definition of the N-UP print page order of the print job schema (part 1). FIG. 35 is a diagram illustrating a definition of the N-UP print page order of the print job schema (part 2).

In FIGS. 34 and 35, the function: PresentationDirection denotes a definition of the N-UP print page order which can be selected by the N-UP print page order selecting unit 253. Although PresentationDirection is a Feature (function), "Range" is not added. This is because the function: PresentationDirection is a function which is nested (included) in the function: NUp as a Sub-Feature (sub-function) of the function: NUp illustrated in FIGS. 33 to 35. That is, "Range" added to the upper function, that is, the function: NUp is also applied to the function: PresentationDirection.

It is a specification of the OS and is one of the features of the OS to which the embodiment can be applied. The option: RightBottom denotes a definition of the selection item of "Left Top→Right Bottom (horizontal). The option: BottomRight denotes a definition of the selection item of "Top Left→Bottom Right (vertical). The option: LeftBottom denotes a definition of the selection item of "Right Top→Left Bottom (horizontal). The option: BottomLeft denotes a definition of the selection item of "Top Right→Bottom Left (vertical). The option: RightTop denotes a definition of the selection item of "Left Bottom→Right Top (horizontal). The option: TopRight denotes a definition of the selection item of "Bottom Left→Top Right (vertical). The option: LeftTop denotes a definition of the selection item of "Right Bottom→Left Top (horizontal). The option: TopLeft denotes a definition of the selection item of "Bottom Right→Top Left (vertical).

FIG. 36 is a diagram illustrating a definition of the media size of the print job schema. In FIG. 36, the function: MediaSize denotes a definition of the media size which can be selected by the media size selecting unit 244. The option: Letter denotes a definition of the selection item of "Letter". The option: Legal denotes a definition of the selection item of "Legal". The option: A5 denotes a definition of the selection item of "A5". The option: A4 denotes a definition of the selection item of "A4". The option: B5 denotes a definition of the selection item of "B5". The option: Photo8×10 denotes a definition of the selection item of "Photo (8×10 inches)".

FIG. 37 is a diagram illustrating a definition of the print quality of the print job schema. In FIG. 37, the function: OutputQuality denotes a definition of the print quality which can be selected by the print quality selecting unit 247. The option: Automatic denotes a definition of the selection item of "Automatic". The option: High denotes a definition of the selection item of "High". The option: Normal denotes a definition of the selection item of "Normal". The option: Draft denotes a definition of the selection item of "Draft".

FIG. 38 is a diagram illustrating a definition of the N-UP print output media size of the print job schema. In FIG. 38, the function: OutputMediaSize denotes a definition of the N-UP print output media size which can be selected by the N-UP print output media size selecting unit 254. The option: Letter denotes a definition of the selection item of "Letter". The option: Legal denotes a definition of the selection item of "Legal". The option: A5 denotes a definition of the selection item of "A5". The option: A4 denotes a definition of the selection item of "A4". The option: B5 denotes a definition of the selection item of "B5". The option: Photo8×10 denotes a definition of the selection item of "Photo (8×10 inches)".

FIGS. 39 to 51 are diagrams illustrating the contents of the print setting files in the integrated print system. In the diagrams, description regarding the contents similar to those of the print setting files illustrated in FIGS. 9 to 20 is omitted and only the different points will be described here.

PrintJobSchemaKeywordMap denotes a definition for allocating each function of the print settings defined as Feature or Option and each option regarding those functions to the print job schema keyword. There is also a case where PrintJobSchemaKeywordMap is abbreviated to "PJSKM" hereinbelow. The print job schema keyword mentioned here denotes a print job schema keyword (Print Job Schema Keyword) defined by pjsk described in FIG. 27. As shown by xmlns:pjsk="http://schemas.abe.com/printjobschemakeywords" in the sixth line in FIG. 27, a name space has been set as a public schema of ABE Co., Ltd. as a manufacturing source of the OS.

Therefore, the definition in which pjsk is described is handled as a public schema of ABE Co., Ltd. To enable pjsk to be correctly handled as a public schema, as a character string designated by PJSKM, it is necessary to use the same character string as that of the definition of Feature or Option (option) defined by the public schema of the print job schema. Further, it is also necessary to use the character string for the definition of Feature or Option in the print setting files in the integrated print system.

In the case of Feature, for example, the character string is as illustrated in FIG. 39. In the case of the definition of the information regarding the sheet feeding method in the print setting files in the integrated print system, it is necessary that the character string of PrintJobInputBin in which one of PrintJob, PrintDocument, and PrintPage has been set to "Range" is used for both of the character string designated by PJSKM and the character string which is used for the definition of Feature.

As an exception, there is PrintJobPresentationDirection illustrated in FIG. 46, which will be described hereinafter. The function: PresentationDirection defined by the print job schema is a Sub-Feature which is nested (included) in the function: NUp and "Range" of the function: NUp is applied thereto. Therefore, "Range" is not added in the definition of the print job schema. However, in the print setting files in the integrated print system of the text format in which the information regarding the print setting has been described by the expression of the non-hierarchical structure, the above function is made to be handled as a Feature of the print job schema by PJSKM. Therefore, it is necessary that the character string of PrintJobPresentationDirection to which "Range" has been added is used for both of the character string designated by PJSKM and the character string which is used for the definition of Feature.

It is a specification of the OS in the integrated print system in which the architecture of the conventional print system which uses the print setting files described by the expression of the non-hierarchical structure is used as a base and the new print system which uses the print job ticket described by the expression of the hierarchical structure is constructed thereon. Such a specification is one of the features of the OS to which the embodiment can be applied.

FIG. 39 is a diagram illustrating information regarding the sheet feeding method in the print setting file in the integrated print system. As illustrated in FIG. 27, the print job schema keyword showing the sheet feeding method is defined as PrintJobInputBin to which PrintJob has been added to "Range". Therefore, PrintJobInputBin is defined to Feature and PJSKM of this Feature, respectively. The print job schema keyword showing the selection item (option) of the sheet feeding method is defined as ASF and Cassette. Therefore, ASF and Cassette are defined to Option and PJSKM of this Option, respectively.

FIG. 40 is a diagram illustrating information regarding the print orientation in the print setting file in the integrated print system. As illustrated in FIG. 28, the print job schema keyword showing the print orientation is defined as PrintPageOrientation in which PrintPage has been added to "Range". Therefore, PrintPageOrientation is defined to Feature and PJSKM of this Feature, respectively. The print job schema keyword showing the selection item of the print orientation is defined as Portrait and Landscape. Therefore, Portrait and Landscape are defined to Option and PJSKM of this Option, respectively.

FIG. 41 is a diagram illustrating information regarding the color printing method in the print setting file in the integrated print system. As illustrated in FIG. 29, the print job schema keyword showing the color printing method is defined as PrintPageOutputColor in which PrintPage has been added to "Range". Therefore, PrintPageOutputColor is defined to Feature and PJSKM of this Feature, respectively. The print job schema keyword showing the selection item of the color printing method is defined as Color and Monochrome. Therefore, Color and Monochrome are defined to Option and PJSKM of this Option, respectively.

FIG. 42 is a diagram illustrating information regarding the resolution in the print setting file in the integrated print system. As illustrated in FIG. 30, the print job schema keyword showing the resolution is defined as PrintPageResolution in which PrintPage has been added to "Range". Therefore, PrintPageResolution is defined to Feature and PJSKM of this Feature, respectively. The print job schema keyword showing the selection item of the resolution is defined as High and Standard. Therefore, High and Standard are defined to Option and PJSKM of this Option, respectively.

FIG. 43 is a diagram illustrating information regarding the media type in the print setting file in the integrated print system. As illustrated in FIG. 31, the print job schema keyword showing the media type is defined as PrintPageMediaType in which PrintPage has been added to "Range". Therefore, PrintPageMediaType is defined to Feature and PJSKM of this Feature, respectively. The print job schema keyword showing the selection item of the media type is defined as Plain and Photo. Therefore, Plain and Photo are defined to Option and PJSKM of this Option, respectively.

The private media type defined by the private schema such as ProPhoto showing a "pro photograph paper" has also been defined. Therefore, ProPhoto is defined to Option showing the "pro photograph paper" and PJSKM of this Option, respectively.

Such a print setting file is used. Therefore, the definition of the private media type defined by the private schema is also fetched into the print job ticket or print job capability in a manner similar to the definition of the public media type defined by the public schema and is correctly processed.

FIG. 44 is a diagram illustrating information regarding the duplex printing in the print setting file in the integrated print system. As illustrated in FIG. 32, the print job schema keyword showing the duplex printing is defined as PrintJobDuplex to which PrintJob has been added to "Range". Therefore, PrintJobDuplex is defined to Feature and PJSKM of this Feature, respectively. The print job schema keyword showing the selection item of the duplex printing is defined as OneSided, TwoSidedLongEdge, and TwoSidedShortEdge. Therefore, OneSided, TwoSidedLongEdge, and TwoSidedShortEdge are defined to Option and PJSKM of this Option, respectively.

FIG. 45 is a diagram illustrating information regarding the N-UP printing in the print setting file in the integrated print system. As illustrated in FIG. 33, the print job schema keyword showing the N-UP printing is defined as PrintJobNUp to which PrintJob has been added to "Range". Therefore, Print- JobNUp is defined to Feature and PJSKM of this Feature, respectively. The print job schema keyword showing the selection item of the N-UP printing is defined as PagesPerSheet1, PagesPerSheet2, PagesPerSheet4, and PagesPerSheet6. Therefore, PagesPerSheet1, PagesPerSheet2, PagesPerSheet4, and PagesPerSheet6 are defined to Option and PJSKM of this Option, respectively.

FIG. 46 is a diagram illustrating information regarding the N-UP print page order in the print setting file in the integrated print system (part 1). FIG. 47 is a diagram illustrating information regarding the N-UP print page order in the print setting file in the integrated print system (part 2). As illustrated in FIGS. 34 and 35, since the print job schema keyword showing the N-UP print page order is a Sub-Feature of the function: NUp as mentioned above, "Range" of the function: NUp is applied. Therefore, although "Range" is not added in terms of the definition of the print job schema, the function and the sub-function are defined as Features having the same route in the print setting files expressed by a format of the non-hierarchical structure.

In order to enable the OS to form the print job ticket or the print capability from such print setting files, on the print setting files, it is necessary to add "Range" so that the OS can process as a function instead of the sub-function in form.

Therefore, the PJPD to which the same function "Range" as PrintJob as the function: NUp illustrated in FIG. 33 as an upper function of PresentationDirection has been added is defined to Feature and PJSKM of this Feature, respectively. PJPD is an abbreviation of PrintJobPresentationDirection.

The print job schema keyword showing the selection item of the N-UP print page order is defined as RightBottom, BottomRight, LeftBottom, BottomLeft, RightTop, TopRight, LeftTop, and TopLeft.

Therefore, RightBottom, BottomRight, LeftBottom, BottomLeft, RightTop, TopRight, LeftTop, and TopLeft are defined to Option and PJSKM of this Option, respectively.

The private N-UP print page order defined by the private schema showing "Left Top→Right Bottom (horizontal) or Top Left→Bottom Right (vertical)" as RightOrBottom is also defined. The private N-UP print page order defined by the private schema showing "Right Bottom→Left Top (horizontal) or Bottom Right→Top Left (vertical)" as LeftOrTop is also defined. RightOrBottom and LeftOrTop are defined to Option showing them and PJSKM of this Option, respectively.

Such a print setting file is used. Therefore, the definition of the private N-UP print page order defined by the private schema is also fetched into the print job ticket or print job capability in a manner similar to the definition of the public N-UP print page order defined by the public schema and is correctly processed.

FIG. 48 is a diagram illustrating information regarding the media size in the print setting file in the integrated print system. As illustrated in FIG. 36, the print job schema keyword showing the media size is defined as PrintPageMediaSize in which PrintPage has been added to "Range". Therefore, PrintPageMediaSize is defined to Feature and PJSKM of this Feature, respectively. The print job schema keyword showing the selection item of the media size is defined as Letter, Legal, A4, and B5. Therefore, Letter, Legal, A4, and B5 are defined to Option and PJSKM of this Option, respectively.

The private media size defined by the private schema showing "A4+" as A4Plus is also defined. Therefore, A4Plus is defined to Option showing "A4+" and PJSKM of this Option, respectively.

Such a print setting file is used. Therefore, the definition of the private media size defined by the private schema is also fetched into the print job ticket or print job capability in a manner similar to the definition of the public media size defined by the public schema and is correctly processed.

FIG. 49 is a diagram illustrating information regarding the print quality in the print setting file in the integrated print system. As illustrated in FIG. 37, the print job schema keyword showing the print quality is defined as PrintPageOutputQuality in which PrintPage has been added to "Range". Therefore, PrintPageOutputQuality is defined to Feature and PJSKM of this Feature, respectively.

The print job schema keyword showing the selection item of the print quality is defined as Automatic, High, and Normal. Therefore, Automatic, High, and Normal are defined to Option and PJSKM of this Option, respectively.

FIG. 50 is a diagram illustrating information regarding the N-UP print output media size in the print setting file in the integrated print system. As illustrated in FIG. 38, the print job schema keyword showing the N-UP print output media size is defined as PrintPageOutputMediaSize in which PrintPage has been added to "Range". Therefore, PrintPageOutputMediaSize is defined to Feature and PJSKM of this Feature, respectively.

The print job schema keyword showing the selection item of the N-UP print output media size is defined as Letter, Legal, A4, and B5. Therefore, Letter, Legal, A4, and B5 are defined to Option and PJSKM of this Option, respectively.

The private N-UP print output media size defined by the private schema showing "A4+" as A4Plus is also defined. Therefore, A4Plus is defined to Option showing "A4+" and PJSKM of this Option, respectively.

Such a print setting file is used. Therefore, the definition of the private N-UP print output media size defined by the private schema is also fetched into the print job ticket or print job capability in a manner similar to the definition of the public media size defined by the public schema and is correctly processed.

FIG. 51 is a diagram illustrating information regarding the command control in the print setting file in the integrated print system. In FIG. 51, description of the portions of the same contents as those in FIG. 20 is omitted here. In FIG. 51, CmdGetPrnJobCaps denotes a control method of the control command at the time when the printer driver 50 returns the print job capability to the application 30. Control order is ANY and a name of the control function is CMD_ID_GETPRNJOBCAPS.

FIG. 52 is a diagram illustrating the specifications of the control functions for controlling each print control command in the integrated print system. In FIG. 52, description of the portions of the same contents as those in FIG. 22 is omitted here. Each control function illustrated in FIG. 51 has such specifications that processes as illustrated in FIG. 52 or FIG. 22 are executed and their processing results are returned. Those control functions have been installed in the UI plug-in 39. The control functions illustrated in FIG. 51 are CMD_ID_STARTJOB, CMD_ID_STARTDOC, CMD_ID_STARTPAGE, CMD_ID_ENDPAGE, and the like. The control functions illustrated in FIG. 51 also include CMD_ID_ENDDOC, CMD_ID_ENDJOB, CMD_ID_GETPRNPROPERTIES, CMD_ID_GETPRNJOBCAPS, and the like.

Figure 53:
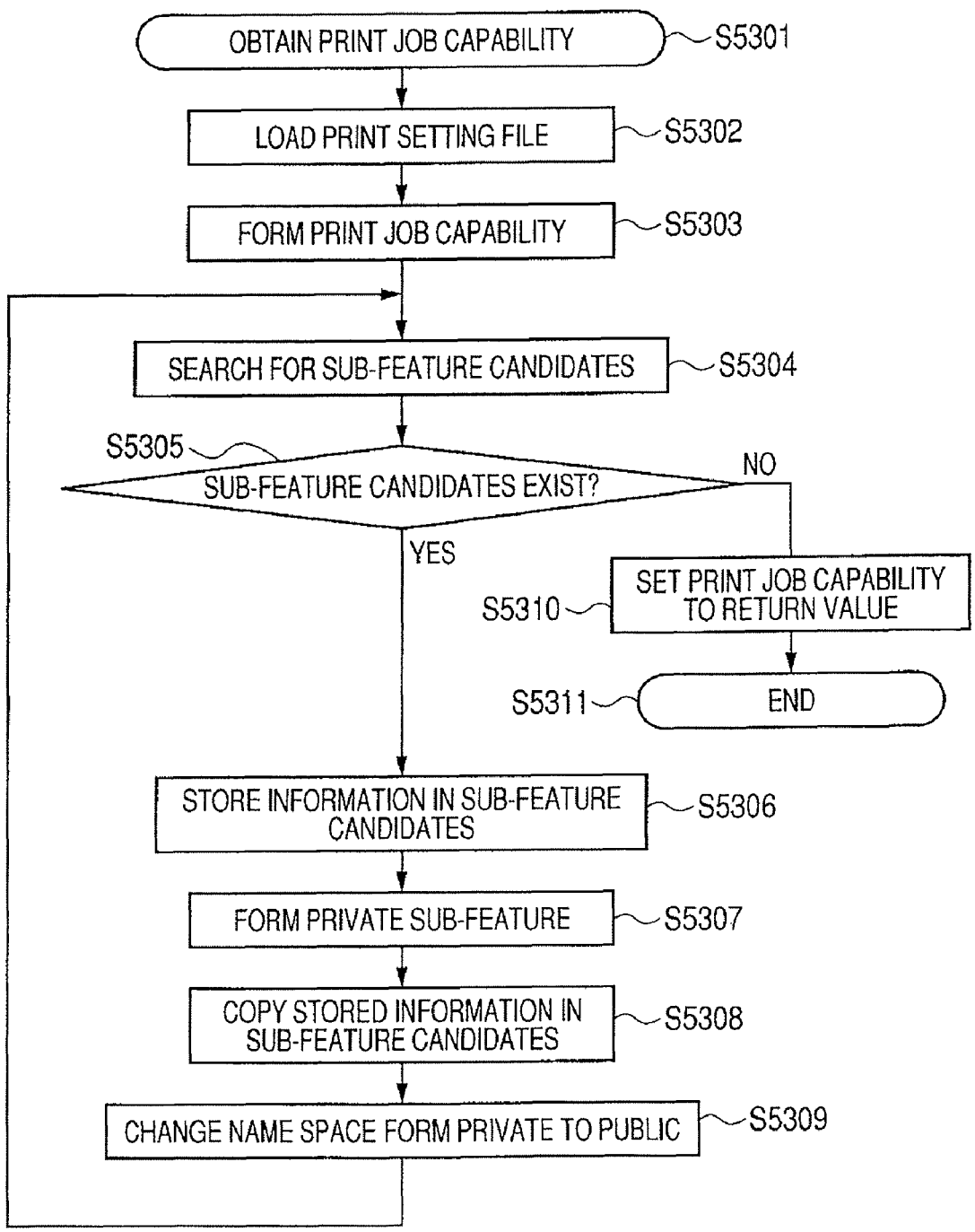
FIG. 53 is a flowchart illustrating an obtaining process of a print job capability in the integrated print system.

FIG. 53 is a flowchart illustrating an obtaining process of the print job capability in the integrated print system. When the application 30 calls the print job capability obtaining API in order to obtain the print job capability from the printer driver 50, the UI module 35 is loaded into the OS. The obtaining process of the print job capability illustrated in FIG. 53 is started in the UI module 35 or the like (S5301).

Subsequently, the UI module 35 loads the print setting files in the integrated print system illustrated in FIGS. 39 to 51 (S5302). Then, the UI module 35 forms the print job capability (first job ticket) from the print setting files (S5303).

It is control of the OS, that is, specifications of the OS. At this point of time, the formed print job capability (first job ticket) is the capability formed by the process in the OS from the print setting files in the integrated print system of the text format in which the information regarding the print setting has been described by the expression of the non-hierarchical structure. An example of operation setting information is a print setting file.

Therefore, for example, in the print job schema, as illustrated in FIG. 54, PD defined as a Sub-Feature of the function: NUp is formed in the print job capability as Feature having the same route as that of the function: NUp. The PD is an abbreviation of PresentationDirection. More detailed description will be made hereinafter in FIG. 57. ns1 denotes that for pjsk as a print job schema keyword defined as a public schema, this keyword has been defined by the private schema.

Subsequently, the UI plug-in 39 searches for candidates of Sub-Feature from the print job capability formed in step S5303 (S5304). Then, the UI plug-in 39 discriminates the presence or absence of the Sub-Feature candidates as a result of the search (S5305).

If it is determined that the Sub-Feature candidates exist (YES in S5305), the UI plug-in 39 stores the information in the Sub-Feature candidates (S5306). For example, although the function: PresentationDirection illustrated in FIG. 54 shows a Feature to which "Range" as PrintJob has been added here, it is a Sub-Feature candidate. Therefore, in S5306, the UI plug-in 39 stores the following information in such a candidate.

```
<pjsf:Option name="ns1:RightBottom">
    <pjsf:Property name="ns1:DisplayName">
        <pjsf:Value
xsi:type="xsd:string">Horizontally from top left to bottom right</pjsf:Value>
    </pjsf:Property>
</pjsf:Option>
```

Subsequently, the UI plug-in 39 forms a private Sub-Feature based on the Sub-Feature candidates found in step S5305 by the searching process in step S5304 (S5307). For example, in the definition of the print job schema, PresentationDirection is a Sub-Feature of the function: NUp. Therefore, as illustrated in FIG. 55, the following private Sub-Features are formed as Sub-Features in the function: NUp.

```
<pjsf:Feature
name="ns1:PresentationDirection">
</pjsf:Feature>
```

Subsequently, for the formed private Sub-Feature, the UI plug-in 39 copies the information in the Sub-Feature candidates stored in step S5306 (S5308).

For instance, in the example illustrated in FIG. 55, the following information is copied into PresentationDirection as a private Sub-Feature formed in step S5307.

```
<pjsf:Option name="ns1:RightBottom">
    <pjsf:Property name="ns1:DisplayName">
        <pjsf:Value
xsi:type="xsd:string">Horizontally from top left to bottom right</pjsf:Value>
    </pjsf:Property>
</pjsf:Option>
```

At this point of time, since the information expressed as a keyword of ns1 is information defined by the private schema, it is handled as information defined by the private schema.

Subsequently, for the formed private Sub-Feature and the information copied into this Sub-Feature, the UI plug-in 39 changes their name spaces from the private to the public (S5309). The UI plug-in 39 returns the processing routine to step S5304.

For example, in the example illustrated in FIG. 55, for the following information expressed as a keyword of ns1, the name space is changed from the private to the public like ns1→pjsk.

```
<pjsf:Feature
name="ns1:PresentationDirection">
    <pjsf:Option name="ns1:RightBottom">
        <pjsf:Property
name="ns1:DisplayName"><pjsf:Value
xsi:type="xsd:string">Horizontally from top left to bottom right</pjsf:Value>
        </pjsf:Property>
    </pjsf:Option>
</pjsf:Feature>
```

As illustrated in FIG. 56, a part of the following print job capability (second job ticket) is completed.

```
<pjsf:Feature
name="pjsk:PresentationDirection">
    <pjsf:Option name="pjsk:RightBottom">
        <pjsf:Property name="pjsk:DisplayName">
        <pjsf:Value
xsi:type="xsd:string">Horizontally from top left to bottom right</pjsf:Value>
        </pjsf:Property>
    </pjsf:Option>
</pjsf:Feature>
```

In the discrimination of step S5305, if it is determined that there are no Sub-Feature candidates (NO in S5305), the UI plug-in 39 sets the latest print job capability formed at this point of time to a return value (S5310). The UI plug-in 39 finishes the obtaining process of the print job capability (S5311).

Thus, the print job capability (second job ticket) of the printer 3 which can be obtained through the printer driver 50 and as shown in FIGS. 57 to 67, which will be described hereinafter, is completed.

FIG. 54 is a diagram illustrating a part of the print job capability formed in step S5303 of the obtaining process of the print job capability in the integrated print system illustrated in FIG. 53. For example, PresentationDirection defined as a Sub-Feature of the function: NUp in the print job schema is formed in the print job capability as a Feature having the same route as that of the function: NUp.

The more detailed description will be made in FIG. 57. For pjsk as a print job schema keyword defined as a public schema, ns1 shows here that this keyword is defined by the private schema.

FIG. 55 is a diagram illustrating a part of the print job capability formed in steps S5307 and S5308 of the obtaining process of the print job capability in the integrated print system illustrated in FIG. 53. For example, in the definition of the print job schema, PresentationDirection is a Sub-Feature of the function: NUp. Therefore, the following private Sub-Features are formed as Sub-Features in the function: NUp.

```
<pjsf:Feature
    name="ns1:PresentationDirection">
</pjsf:Feature>
```

For the formed private Sub-Features, the following information in the Sub-Feature candidates stored in step S5306 in FIG. 53 is copied to PresentationDirection as a private Sub-Feature.

```
<pjsf:Option name="ns1:RightBottom">
<pjsf:Property name="ns1:DisplayName">
<pjsf:Value
    xsi:type="xsd:string">Horizontally from top left to bottom right</pjsf:Value>
</pjsf:Property>
</pjsf:Option>
```

At this point of time, since the information expressed as a keyword of ns1 is information defined by the private schema, it is handled as information defined by the private schema.

FIG. 56 is a diagram illustrating a part of the print job capability formed in step S5309 of the obtaining process of the print job capability in the integrated print system illustrated in FIG. 53. The following processes are executed to the private Sub-Feature formed in step S5307 in FIG. 53 and the information copied into such a Sub-Feature in step S5308 in FIG. 53. That is, in step S5309 in FIG. 53, the name space of the information copied into the Sub-Feature is changed from the private to the public. Thus, for instance, in the example illustrated in FIG. 55, for the information expressed as a keyword of ns1, the name space is changed from the private to the public like ns1→pjsk. The following information is formed.

```
<pjsf:Feature         name="ns1:
PresentationDirection">
    <pjsf:Option name="ns1:RightBottom">
    <pjsf:Property
name="ns1:DisplayName"><pjsf:Value
xsi:type="xsd:string">Horizontally from top left to bottom right</pjsf:Value>
    </pjsf:Property>
    </pjsf:Option>
</pjsf:Feature>
,
<pjsf:Feature         name="pjsk:
PresentationDirection">
    <pjsf:Option name="pjsk:RightBottom">
    <pjsf:Property name="pjsk:DisplayName">
    <pjsf:Value
xsi:type="xsd:string">Horizontally from top left to bottom right</pjsf:Value>
    </pjsf:Property>
    </pjsf:Option>
</pjsf:Feature>
```

In this manner, the above print job capability is completed.

FIGS. 57 to 67 are diagrams illustrating the print job capability of the printer 3 which can be obtained through the printer driver 50 in the integrated print system. In those diagrams, description of the contents described in FIGS. 27 to 38 is omitted here.

FIG. 57 is a diagram illustrating the name space and the sheet feeding method of the print job capability of the printer 3 which can be obtained through the printer driver 50 in the integrated print system. In FIG. 57, the name space of the private print job schema is defined in the sixth line. It will be understood from this definition that information shown as ns1 has been defined as a private schema. In step S5303 in FIG. 53, the print job capability is formed from the print setting files in the integrated print system.

FIG. 58 is a diagram illustrating the print orientation of the print job capability of the printer 3 which can be obtained through the printer driver 50 in the integrated print system. In step S5303 in FIG. 53, the print job capability is formed from the print setting files in the integrated print system.

FIG. 59 is a diagram illustrating the color printing method of the print job capability of the printer 3 which can be obtained through the printer driver 50 in the integrated print system. In step S5303 in FIG. 53, the print job capability is formed from the print setting files in the integrated print system.

FIG. 60 is a diagram illustrating the resolution of the print job capability of the printer 3 which can be obtained through the printer driver 50 in the integrated print system. In step S5303 in FIG. 53, the print job capability is formed from the print setting files in the integrated print system.

FIG. 61 is a diagram illustrating the media type of the print job capability of the printer 3 which can be obtained through the printer driver 50 in the integrated print system. In step S5303 in FIG. 53, the print job capability is formed from the print setting files in the integrated print system. The option: ProPhoto is a private Option of "ProPhoto".

FIG. 62 is a diagram illustrating the duplex printing method of the print job capability of the printer 3 which can be obtained through the printer driver 50 in the integrated print system. In step S5303 in FIG. 53, the print job capability is formed from the print setting files in the integrated print system.

FIG. 63 is a diagram illustrating the N-UP printing of the print job capability of the printer 3 which can be obtained through the printer driver 50 in the integrated print system (part 1). FIG. 64 is a diagram illustrating the N-UP printing of the print job capability of the printer 3 which can be obtained through the printer driver 50 in the integrated print system (part 2). In steps S5303 to S5309 in FIG. 53, the print job capability is formed from the print setting files in the integrated print system. The option: RightOrBottom is a private Option showing "Left Top→Right Bottom (horizontal) or Top Left→Bottom Right (vertical)". The option: LeftOrTop is a private Option showing "Right Bottom→Left Top (horizontal) or Bottom Right→Top Left (vertical)".

FIG. 65 is a diagram illustrating the media size of the print job capability of the printer 3 which can be obtained through the printer driver 50 in the integrated print system. In step S5303 in FIG. 53, the print job capability is formed from the print setting files in the integrated print system. The option: A4Plus is a private Option showing "A4+".

FIG. 66 is a diagram illustrating the print quality of the print job capability of the printer 3 which can be obtained through the printer driver 50 in the integrated print system. In step S5303 in FIG. 53, the print job capability is formed from the print setting files in the integrated print system.

FIG. 67 is a diagram illustrating the N-UP print output media size of the print job capability of the printer 3 which can be obtained through the printer driver 50 in the integrated print system. In step S5303 in FIG. 53, the print job capability is formed from the print setting files in the integrated print system. The option: A4Plus is a private Option showing "A4+".

A construction of a data processing program which can be read out by the peripheral apparatus control system constructed by the information processing apparatus and the peripheral apparatus according to the embodiment will be described hereinbelow with reference to a memory map illustrated in FIG. 68.

Figure 68:
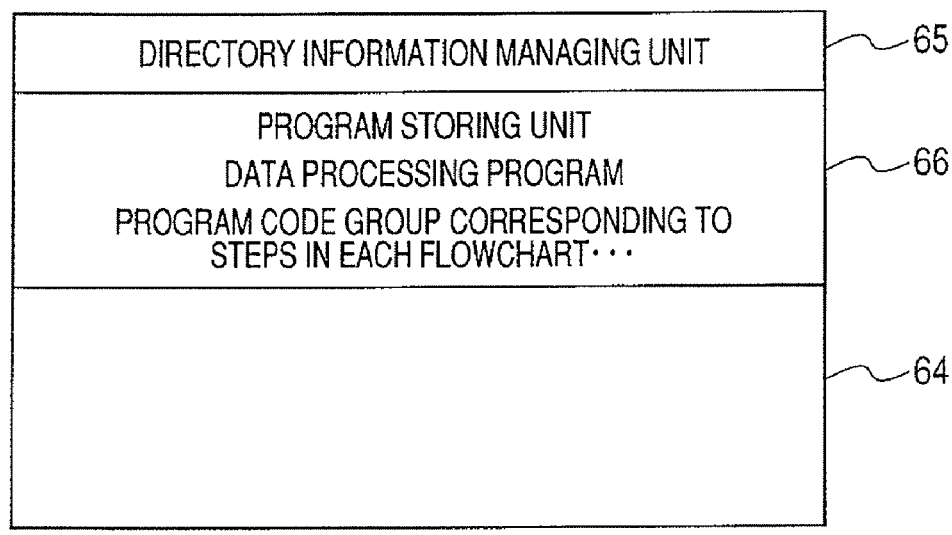
FIG. 68 is a diagram illustrating a memory map of a storing medium in which various data processing programs which can be read out by the peripheral apparatus control system have been stored.

FIG. 68 is a diagram illustrating the memory map of a storing medium in which various data processing programs which can be read out by the peripheral apparatus control system have been stored. Although not shown in particular, it is assumed that information for managing a program group stored in the storing medium, for example, version information, an implementer's name, and the like have also been stored in the storing medium. Although not shown in particular, information depending on the OS or the like on the program reading side, for example, an icon or the like for identifying and indicating the program may be also recorded in the recording medium.

In FIG. 68, it is now assumed that a storing medium 64 is constructed by a hard disk. Data depending on the various programs are managed in a directory information managing unit 65. A program for installing the various programs into the information processing apparatus and, if the installing program has been compressed, a program for decompressing it, and the like have also been stored in a program storing unit 66.

The various functions which can be realized by executing processes in the flowchart shown in each of FIGS. 23 to 25 and 53 in the embodiment may be realized by the information processing apparatus by a program which is installed from the outside. In such a case, the embodiment is also applied to a case where an information group including the programs is supplied to the information processing apparatus and the peripheral apparatus by a storing medium such as CD-ROM, flash memory, flexible disk, or the like or from an external storing medium through a network.

The object of the described embodiment is also accomplished by a method whereby a storage medium in which program codes of software for realizing the functions of the embodiment have been recorded as mentioned above is supplied to the system or the apparatus and a computer (or a CPU or MPU) of the system or the apparatus reads out the program codes stored in the storage medium and executes processes according to the program codes.

In this case, the program codes themselves read out of the storage medium realize the novel functions of the described embodiment. Therefore, the storage medium in which the program codes have been stored constitutes an embodiment. As a storage medium for supplying the program codes, for example, a flexible disk, a hard disk, an optical disk, a magnetooptic disk, a CD-ROM, a CD-R, a magnetic tape, a non-volatile memory card, a ROM, an EEPROM, or the like can be used.

The invention is not limited only to the case where the computer executes the read-out program codes, so that the functions of the described embodiment are realized, but also incorporates a case where, for example, the OS or the like which is operating on the computer executes a part or all of the actual processes based on instructions of the program codes and the functions of the described embodiment mentioned above are realized by those processes.

As described above, in the described embodiment, the print job capability (first job ticket) of the non-hierarchical structure is formed from the print setting files of the non-hierarchical structure which is used for the print control. The print job capability (second job ticket) of the hierarchical structure is formed from the first job ticket. Thus, the peripheral apparatus control system in which the conventional print system using the print setting files and the print control structure and the new print system using the print job ticket/print job capability (job ticket) have been integrated can be realized.

In the described embodiment, the text editor having the printing function has been mentioned as an example of the application 30. However, the invention is not limited to such an example but the described embodiment can be realized by, for instance, an arbitrary application in which the information is obtained from the peripheral apparatus and used and it is effective.

Although a color ink-jet printer has been used as an example of the printer in the described embodiment, the invention is not limited to such an example but an arbitrary printer such as a monochromatic LBP or the like can be used.

Although the personal computer has been presumed as an information processing apparatus in the described embodiment, the invention is not limited to such an example but the described embodiment can be realized by, for instance, an arbitrary terminal such as a DVD video player, a gaming apparatus, a set-top box, an Internet household appliances, or the like to which a using method similar to that mentioned above can be used and it is effective.

Although the printer has been mentioned as an example of the peripheral apparatus, the described embodiment can be also applied to other apparatuses such as copying apparatus, facsimile apparatus, scanner, digital camera, a hybrid apparatus having their functions, and the like as a peripheral apparatus.

Although Windows (registered trademark) XP has been used as an example of the OS in the described embodiment, the invention is not limited to such an OS but another arbitrary OS can be also used.

Although the USB interface has been used as an interface between the PC 1 and the printer 3 in the described embodiment, the invention is not limited to such an interface but, for example, an arbitrary interface such as Ethernet (registered trademark), wireless LAN, IEEE1394, Bluetooth, IrDA, parallel interface, serial interface, or the like can be also used.

As mentioned above, according to the described embodiment, the job ticket of the hierarchical structure can be efficiently and accurately formed from the print setting files of the non-hierarchical structure.

According to the described embodiment, since the first job ticket is formed by using the OS standard function, the correct job ticket can be efficiently formed.

According to the described embodiment, since the information regarding the print setting held by the peripheral apparatus or the driver for controlling the peripheral apparatus is obtained from the first job ticket, held, copied to the second job ticket, and used, the correct job ticket can be efficiently formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188328, filed Jul. 7, 2006, which is hereby incorporated by reference herein in its entirety.

What is claimed is:

1. An information processing apparatus which executes an application that uses hierarchical operation instructing information for an operation of a peripheral apparatus, wherein the hierarchical operation instructing information has a hierarchical structure, the information processing apparatus comprising:
- a peripheral apparatus control unit constructed to control the peripheral apparatus; and
- a forming unit constructed to form the hierarchical operation instructing information from operation instructing information converted from a setting file including a specific setting, wherein the setting file has a non-hierarchical structure, wherein the conversion from the setting file to the operation instructing information is performed by a module of an operating system of the information processing apparatus, wherein the operation instructing information includes the specific setting in a private area of the operation instructing information, wherein the forming unit forms, by a plug-in module for customizing control of the module of the operating system to be peculiar to a printer, the hierarchical operation instructing information such that the specific setting is included in a public area of the hierarchical operation instructing information, wherein the specific setting is defined as a sub-setting of another setting in the public area of the hierarchical operation instructing information, and wherein the specific setting is provided with an effective range in the setting file such that the specific setting can be controlled by the operating system in spite of being defined as the sub-setting of the other setting.

2. An information processing apparatus according to claim 1, wherein the forming unit forms the hierarchical operation instructing information in response to a call from the application.

3. An information processing apparatus according to claim 1, wherein the forming unit obtains information regarding the setting file from the operation instructing information, stores the information regarding the setting file, and copies the stored information regarding the setting file into the hierarchical operation instructing information.

4. An information processing apparatus according to claim 1, wherein the hierarchical operation instructing information is a print ticket described using XML.

5. A peripheral apparatus control method in an information processing apparatus which executes an application that uses hierarchical operation instructing information for an operation of a peripheral apparatus, wherein the hierarchical operation instructing information has a hierarchical structure, the information processing apparatus comprising:
- controlling the peripheral apparatus; and
- forming the hierarchical operation instructing information from operation instructing information converted from a setting file including a specific setting, wherein the setting file has a non-hierarchical structure, wherein the conversion from the setting file to the operation instructing information is performed by a module of an operating system of the information processing apparatus, wherein the operation instructing information includes the specific setting in a private area of the operation instructing information, wherein the forming unit forms, by a plug-in module for customizing control of the module of the operating system to be peculiar to a printer, the hierarchical operation instructing information such that the specific setting is included in a public area of the hierarchical operation instructing information, wherein the specific setting is defined as a sub-setting of another setting in the public area of the hierarchical operation instructing information, and wherein the specific setting is provided with an effective range in the setting file such that the specific setting can be controlled by the operating system in spite of being defined as the sub-setting of the other setting.

6. A method according to claim 5, wherein the forming step forms the hierarchical operation instructing information in response to a call from the application.

7. A method according to claim 5, wherein in the forming step, information regarding the setting file is obtained from the operation instructing information and stored, and the stored information regarding the setting file is copied to the hierarchical operation instructing information.

8. A method according to claim 5, wherein the hierarchical operation instructing information is a print ticket described using XML.

9. A non-transitory computer-readable storage medium storing a control program for causing a computer to execute a peripheral apparatus control method according to claim 5.

* * * * *